US009685077B2

(12) United States Patent
Schlienz et al.

(10) Patent No.: US 9,685,077 B2
(45) Date of Patent: Jun. 20, 2017

(54) TRAFFIC CONTROL SYSTEM

(71) Applicant: Rohde & Schwarz GmbH & Co. KG, Munich (DE)

(72) Inventors: Jürgen Schlienz, Poing (DE); Sandra Merkel, München (DE)

(73) Assignee: ROHDE & SCHWARZ GMBH & CO KG, München (DE)

( * ) Notice: Subject to any disclaimer, the term of this patent is extended or adjusted under 35 U.S.C. 154(b) by 0 days.

(21) Appl. No.: 14/950,610

(22) Filed: Nov. 24, 2015

(65) Prior Publication Data

US 2016/0155327 A1 Jun. 2, 2016

(30) Foreign Application Priority Data

Nov. 27, 2014 (EP) ..................... 14195087

(51) Int. Cl.
*G08G 1/095* (2006.01)
*G08G 1/01* (2006.01)
(Continued)

(52) U.S. Cl.
CPC ............... *G08G 1/01* (2013.01); *A61H 3/061* (2013.01); *B60Q 9/008* (2013.01); *B61L 23/00* (2013.01); *B61L 29/18* (2013.01); *B61L 29/246* (2013.01); *B61L 29/28* (2013.01); *G08G 1/005* (2013.01); *G08G 1/07* (2013.01); *G08G 1/087* (2013.01); *G08G 1/0965* (2013.01); *G08G 1/096716* (2013.01); *G08G 1/096725* (2013.01);
(Continued)

(58) Field of Classification Search
CPC ........... G08G 1/01; G08G 1/00; H04W 8/005; H04W 4/046
See application file for complete search history.

(56) References Cited

U.S. PATENT DOCUMENTS

2014/0119544 A1  5/2014  Lee
2015/0312953 A1* 10/2015  Wang ........................ H04L 1/00
370/312

(Continued)

FOREIGN PATENT DOCUMENTS

WO  WO 2014/074681 A1  5/2014

OTHER PUBLICATIONS

Extended European Search Report for European Patent Application No. 14195087.3 (May 18, 2015).

(Continued)

*Primary Examiner* — Erin File
(74) *Attorney, Agent, or Firm* — Jenkins, Wilson, Taylor & Hunt, P.A.

(57) ABSTRACT

A traffic control system (TCS) is provided comprising at least one traffic control unit, TCU, (9) equipped with a proximity enabled traffic user equipment, PETUE, (1) and adapted to control traffic of mobile entities wherein the proximity enabled traffic user equipment, PETUE, (1) of said traffic control unit, TCU, (9) is configured to transmit traffic information by sending at least one discovery message, DM, directly via a user equipment to user equipment link to at least one other proximity enabled traffic user equipment, PETUE, of a mobile entity, wherein said discovery message, DM, includes a proximity service, ProSe, application identifier comprising a string of traffic labels, TLs, representing hierarchical traffic information levels.

13 Claims, 20 Drawing Sheets

(51) Int. Cl.
| | |
|---|---|
| *H04W 4/04* | (2009.01) |
| *H04W 8/00* | (2009.01) |
| *B61L 23/00* | (2006.01) |
| *G08G 1/005* | (2006.01) |
| *G08G 1/07* | (2006.01) |
| *G08G 1/087* | (2006.01) |
| *G08G 1/0965* | (2006.01) |
| *G08G 1/0967* | (2006.01) |
| *G08G 1/16* | (2006.01) |
| *B61L 29/18* | (2006.01) |
| *B61L 29/24* | (2006.01) |
| *B61L 29/28* | (2006.01) |
| *A61H 3/06* | (2006.01) |
| *B60Q 9/00* | (2006.01) |
| *H04L 12/751* | (2013.01) |

(52) U.S. Cl.
CPC .  *G08G 1/096758* (2013.01); *G08G 1/096783* (2013.01); *G08G 1/096791* (2013.01); *G08G 1/163* (2013.01); *H04L 45/02* (2013.01); *H04W 4/046* (2013.01); *H04W 8/005* (2013.01); *A61H 2201/0153* (2013.01); *A61H 2201/0184* (2013.01); *A61H 2201/1635* (2013.01); *A61H 2201/5007* (2013.01); *A61H 2201/5043* (2013.01); *A61H 2201/5048* (2013.01); *A61H 2201/5064* (2013.01); *A61H 2201/5092* (2013.01); *A61H 2201/5097* (2013.01)

(56) References Cited

U.S. PATENT DOCUMENTS

| | | | | |
|---|---|---|---|---|
| 2015/0327157 | A1* | 11/2015 | Al-Shalash | H04W 48/16 370/328 |
| 2016/0037385 | A1* | 2/2016 | Boudreau | H04W 28/18 370/328 |
| 2016/0044507 | A1* | 2/2016 | Agiwal | H04L 63/0428 370/328 |
| 2016/0150373 | A1* | 5/2016 | Kim | H04B 7/026 455/456.3 |

OTHER PUBLICATIONS

Xin Su et al., "An Adaptive Routing Protocol Associated with Urban Traffic Control Mechanism for Vehicular Sensor Networks," 2010 12th IEEE International Conference on High Performance Computing and Communications (HPCC), Poscataway, NJ, USA, pp. 597-602 (Sep. 1, 2010).

* cited by examiner

Fig. 18A  "Forward"
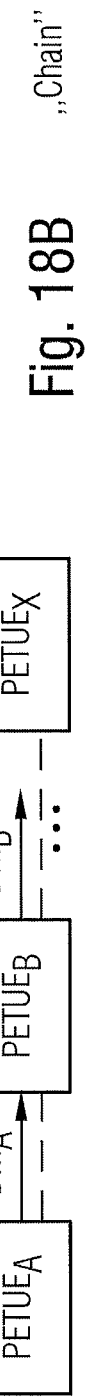
Fig. 18B  "Chain"
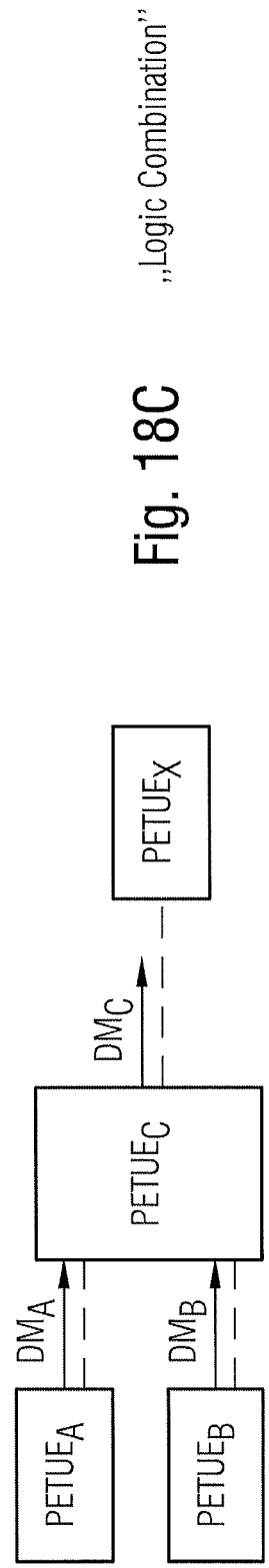
Fig. 18C  "Logic Combination"

TRAFFIC CONTROL SYSTEM

PRIORITY CLAIM

This application claims the benefit of European Application No. 14195087.3, filed Nov. 27, 2014; the disclosure of which is incorporated herein by reference in its entirety.

TECHNICAL FIELD

The invention relates to a traffic control system and to a method for providing traffic control using a discovery message mechanism to transport traffic information.

TECHNICAL BACKGROUND

Traffic control relates to the control of traffic participants in particular to control vehicles in a traffic infrastructure of a predetermined area. Traffic control can involve directing vehicular or pedestrian traffic around a construction zone, accident or other road disruption, thus insuring the safety of emergency response teams, construction workers and public traffic participants. Further, traffic control is performed to avoid traffic congestion or traffic jams.

Vehicles nowadays are equipped with a navigation system which supports the driver to avoid traffic jams. Navigation systems can suggest an alternative route based on a navigation map material and traffic announcements. A navigation system can use a GPS navigation device acquiring position data to locate the vehicle on a road stored in the unit map database. With the road database the navigation system can give directions to other locations along roads. However, conventional navigation systems have the disadvantage that they may rely on not updated or unreliable map data.

Furthermore, vehicles are also equipped with driver assistance systems which support a driver of the vehicle to perform driving maneuvers such as parking maneuvers. These assistance systems can comprise vehicle cameras which are able to capture camera images of the vehicle's surrounding. The camera images of the vehicle's surrounding can be processed to extract traffic information. For example, a speed limit indicated by a traffic sign can be extracted from the captured camera image and used for driver assistance. However, this requires the availability of at least one vehicle camera in the vehicle and further requires sufficient computation resources for processing the camera images for traffic information extraction. A further disadvantage is that the captured camera images depend strongly on the environment. For example in a heavy fog environment it will not be possible to extract speed limit information indicated on a traffic sign.

Accordingly there is a need for an efficient and reliable traffic control system which overcomes the above-mentioned disadvantages.

SUMMARY OF THE INVENTION

The invention provides according to a first aspect a traffic control system, TCS, comprising at least one traffic control unit, TCU, equipped with a proximity enabled traffic user equipment, PETUE, adapted to control traffic of mobile entities,
wherein the proximity enabled traffic user equipment, PETUE, is configured to transmit traffic information by sending at least one discovery message, DM, directly via an user equipment to user equipment link to at least one other proximity enabled traffic user equipment, PETUE, of a mobile entity,
wherein the discovery message, DM, includes a proximity service application identifier comprising a sequence of traffic labels, TLs, representing hierarchical traffic information levels.

An advantage of the traffic control system, TCS, according to the first aspect of the present invention resides in that a discovery mechanism is used requiring no additional technical complexity and being robust against environmental influences. The use of a short range discovery message is resource efficient in particular with respect to resource utilization and energy efficiency. Further, by using, a direct user equipment to user equipment link cellular data traffic is reduced, thus diminishing data traffic in the data network.

In a further embodiment of the traffic control system, TCS, according to the first aspect of the present invention the proximity enabled traffic user equipment comprises a transmitter adapted to broadcast within a broadcast range of the transmitter a proximity service application code provided by a proximity service function and associated with the proximity service application identifier.

In a further embodiment of the traffic control system according to the first aspect of the present invention the proximity enabled traffic user equipment comprises a receiver adapted to receive a broadcasted proximity service application code associated with the proximity service application identifier.

In a further possible embodiment of the traffic control system according to the first aspect of the present invention the proximity enabled traffic user equipment comprises a discovery filter unit adapted to selectively match a received proximity service application code with proximity service application codes stored in a configurable lookup application code memory to retrieve the proximity service application identifier of the respective discovery message.

In a possible embodiment of the traffic control system according to the first aspect of the present invention the lookup application code memory of the proximity enabled traffic user equipment is adapted to store a lookup table comprising application codes with associated proximity service application identifiers.

In a further possible embodiment of the traffic control system according to the first aspect of the present invention the proximity service application identifier output by the discovery filter unit of said proximity enabled traffic user equipment is processed by a processor unit to generate control data in response to the traffic information transported in said proximity service application identifier included in said discovery message.

In a further possible embodiment of the traffic control system according to the first aspect of the present invention the proximity service application identifier comprises a proximity service application identifier name composed of said sequence of traffic levels representing hierarchical traffic information levels and comprises a public land mobile network identifier of a public land mobile network.

In a further possible embodiment of the traffic control system according to the first aspect of the present invention the proximity enabled traffic user equipment is in coverage of an evolved node B of an evolved UMTS terrestrial radio access, eUTRA, interface of a mobile network.

In a further possible embodiment of the traffic control system according to the first aspect of the present invention transmission resources in the time and/or frequency domain used for transmission of the discovery message via said UE-UE link are provided by the evolved node B of the E-UTRA, interface of the mobile network.

In a further possible embodiment of the traffic control system according to the first aspect of the present invention the lookup table stored in the lookup application code memory of the proximity enabled traffic user equipment is configured and updated by the evolved node B covering said proximity enabled traffic user equipment.

In a further possible embodiment of the traffic control system according to the first aspect of the present invention the broadcast range and/or broadcast signal strength of the transmitter within the proximity service enabled traffic user equipment is adjustable.

In a further possible embodiment of the traffic control system according to the first aspect of the present invention the broadcast range and/or broadcast signal strength of the transmitter of the proximity service enabled traffic user equipment is adjusted automatically depending on the proximity service application identifier of the broadcasted discovery message and/or depending on a movement speed of the proximity service enabled traffic user equipment.

In a further possible embodiment of the traffic control system according to the first aspect of the present invention the sequence of traffic labels representing the hierarchical traffic information levels within the proximity service application identifier of the discovery message sent by a proximity enabled traffic user equipment comprises traffic direction information indicating a current and/or future moving direction of a proximity enabled traffic user equipment of a mobile entity.

In a further possible embodiment of the traffic control system according to the first aspect of the present invention the sequence of traffic labels representing hierarchical traffic information levels within the proximity service application identifier of the discovery message comprises validity information indicating a validity time, a validity range and/or a validity scope of the traffic information transported in the proximity service application identifier of the discovery message.

The invention further provides according to a second aspect a proximity enabled traffic user equipment comprising the features of claim 15.

The invention provides according to the second aspect a proximity enabled traffic user equipment, PETUE, for a traffic control system, TCS, according to the first aspect of the present invention, said proximity enabled traffic user equipment, PETUE, comprising
a transmitter adapted to broadcast within a broadcast range of the transmitter a proximity service application code provided by a proximity service function and associated with the proximity service application identifier of a discovery message, DM, and
a receiver adapted to receive a broadcasted proximity service application code associated with a proximity service application identifier of a discovery message, DM.

In a possible embodiment of the proximity enabled traffic user equipment according to the second aspect of the present invention said proximity enabled traffic user equipment further comprises a discovery filer unit adapted for selectively matching a received proximity service application code with proximity service application codes stored in a configurable lookup application code memory to retrieve the proximity service application identifier of the received discovery message.

The invention further provides according to a third aspect a traffic control unit, TCU, comprising the features of claim 17.

The invention provides according to the third aspect a traffic control unit, TCU, for a traffic control system, TCS, according to the first aspect of the present invention wherein the traffic control unit, TCU, comprises a proximity enabled traffic user equipment, PETUE, according to the second aspect of the present invention and further comprises a processing unit adapted to process the proximity service application identifier output by the discovery filter to generate control data adapted to control an actuator.

In a possible embodiment of the traffic control unit according to the third aspect of the present invention the traffic control unit comprises an infrastructure control unit of an infrastructure entity.

The infrastructure entity can be in a possible embodiment a traffic sign or a traffic light.

In a further possible embodiment of the traffic control unit according to the third aspect of the present invention the traffic control unit comprises a vehicle control unit of a vehicle.

The vehicle is in a preferred embodiment a land vehicle comprising a car, truck or bus, in particular an emergency vehicle. The vehicle can also comprise a train.

In a further possible embodiment of the traffic control unit according to the third aspect of the present invention the traffic control unit is a mobile device control unit of a handheld mobile device in particular of a mobile phone.

The invention further provides according to a fourth aspect a navigation system for a vehicle controlled by a traffic control system, TCS, according to the first aspect of the present invention, said vehicle comprising a proximity enabled traffic user equipment, PETUE, according to the second aspect of the present invention, wherein control data is generated by a processing unit of said navigation system in response to the proximity service application identifier provided by the discovery filter unit of the proximity enabled traffic user equipment.

The invention further provides according to a fifth aspect a method comprising the features of claim 20.

The invention provides according to the fifth aspect a method for providing traffic control, wherein traffic information is transported in a discovery message, DM, broadcasted by a proximity enabled traffic user equipment, PETUE, via a user equipment to user equipment link to another proximity enabled traffic user equipment, PETUE, wherein said discovery message, DM, includes a proximity service application identifier comprising a sequence of traffic labels, TLs, representing hierarchical traffic information levels.

In a possible embodiment of the method according to the fifth aspect of the present invention a broadcast range and/or a signal strength of the broadcasted discovery message, DM, is adjusted automatically depending on the proximity service application identifier of the broadcasted discovery message, DM, and/or depending on a movement speed of the proximity enabled traffic user equipment, PETUE.

In a further possible embodiment of the method according to the fifth aspect of the present invention the sequence of traffic labels, TLs, representing hierarchical traffic information levels within the proximity service application identifier of the discovery message, DM, sent by the proximity enabled traffic user equipment, PETUE, comprises traffic direction information indicating a current and/or a future moving direction of a proximity enabled traffic user equipment, PETUE, within a mobile entity.

In a further possible embodiment of the method according to the fifth aspect of the present invention the sequence of traffic labels, TLs, representing hierarchical traffic information levels within the proximity service application identifier of the discovery message, DM, sent by a proximity enabled traffic user equipment, PETUE, comprises validity information indicating a validity time, a validity range and/or a validity scope of the traffic information transported in the proximity service application identifier of the discovery message, DM.

In a further possible embodiment of the method according to the fifth aspect of the present invention the discovery message, DM, is broadcasted by the proximity enabled traffic user equipment, PETUE, periodically with a predetermined or adjusted broadcast repetition rate, RR.

In a further possible embodiment of the method according to the fifth aspect of the present invention the broadcast repetition rate, RR, is adjusted depending on the proximity service application identifier of the broadcasted discovery message, DM, and/or depending on a moving speed of the proximity enabled traffic user equipment, PETUE.

BRIEF DESCRIPTION OF FIGURES

In the following possible embodiments of the different aspects of the present invention are described with reference to the enclosed figures in more detail.

FIG. 18 A, B, C illustrate possible operation modes of a traffic control system and a traffic control method according to the present invention;

DETAILED DESCRIPTION OF EMBODIMENTS

Figure 1:
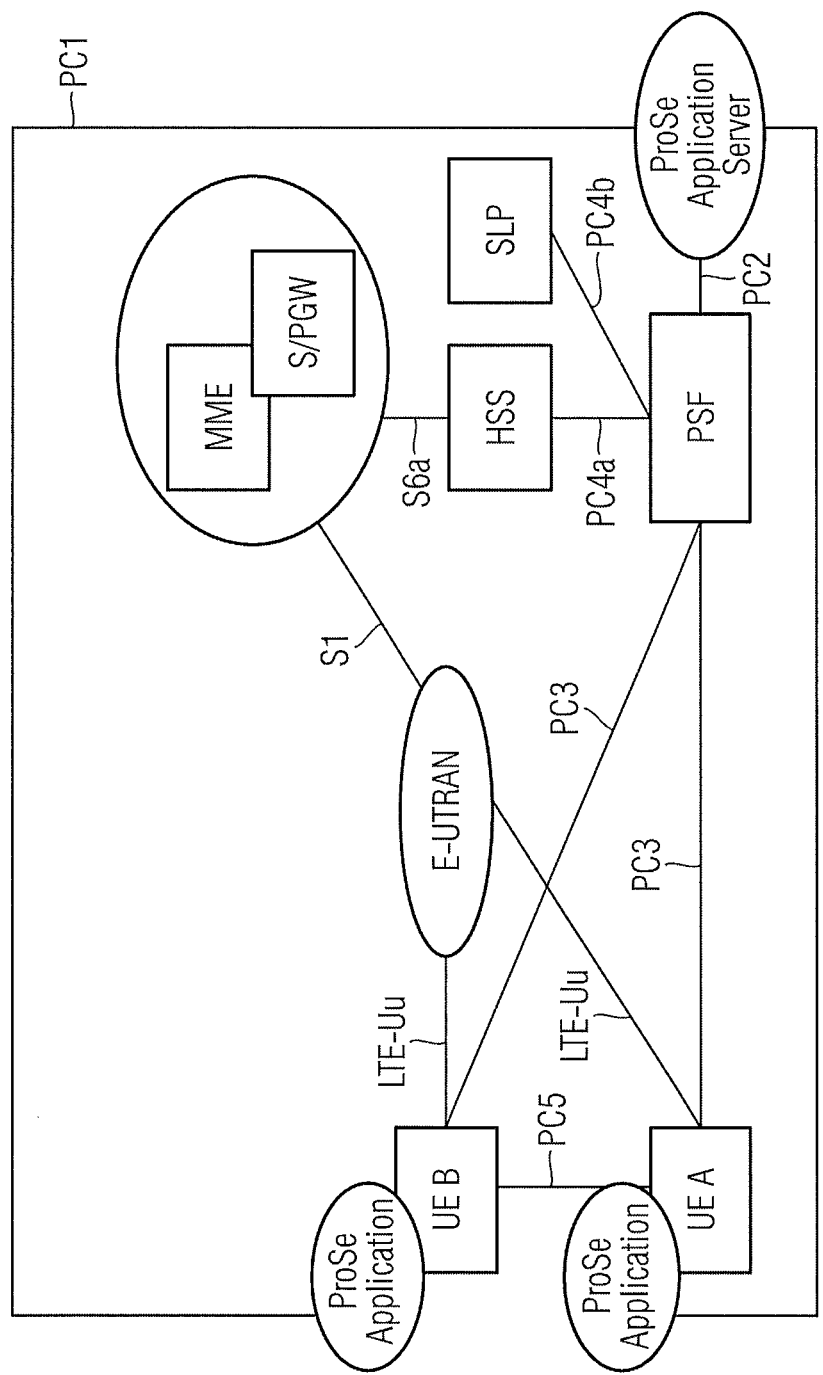
FIG. 1 shows a diagram for a possible exemplary network architecture of a network used by the traffic control system and traffic control method according to the present invention.
Figure 4:
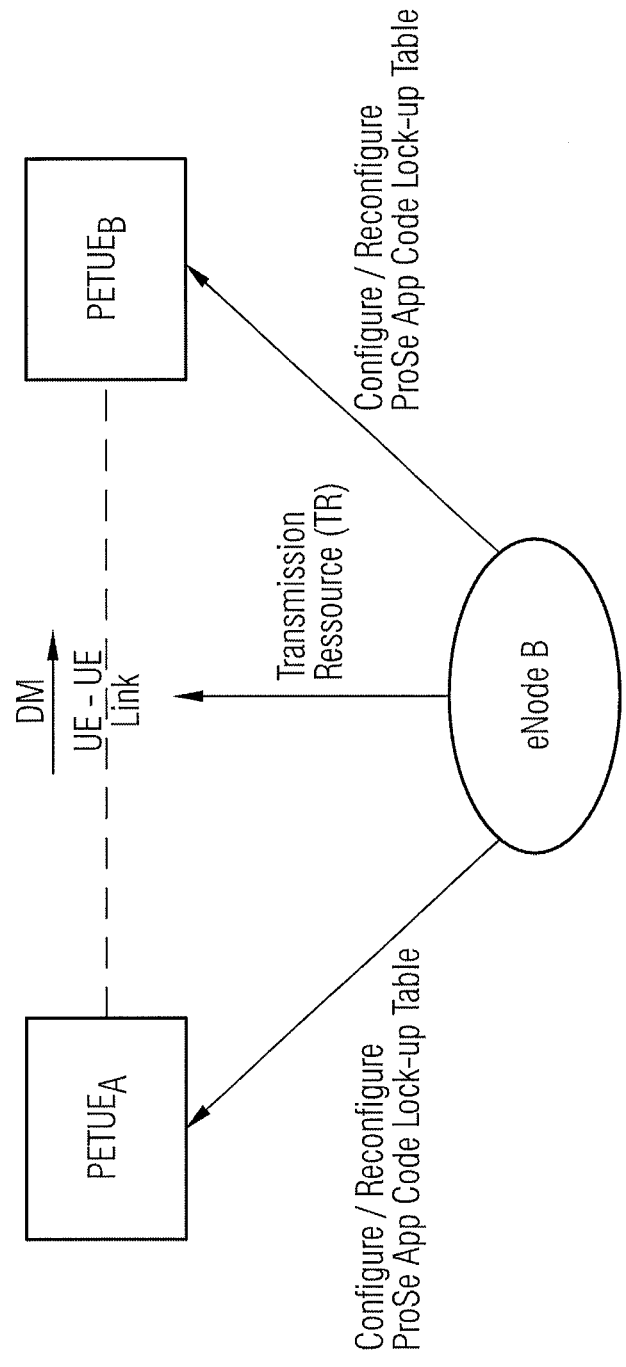
FIG. 4 shows a diagram for illustrating an operation traffic control system and traffic control method according to an aspect of the present invention.
Figure 19:
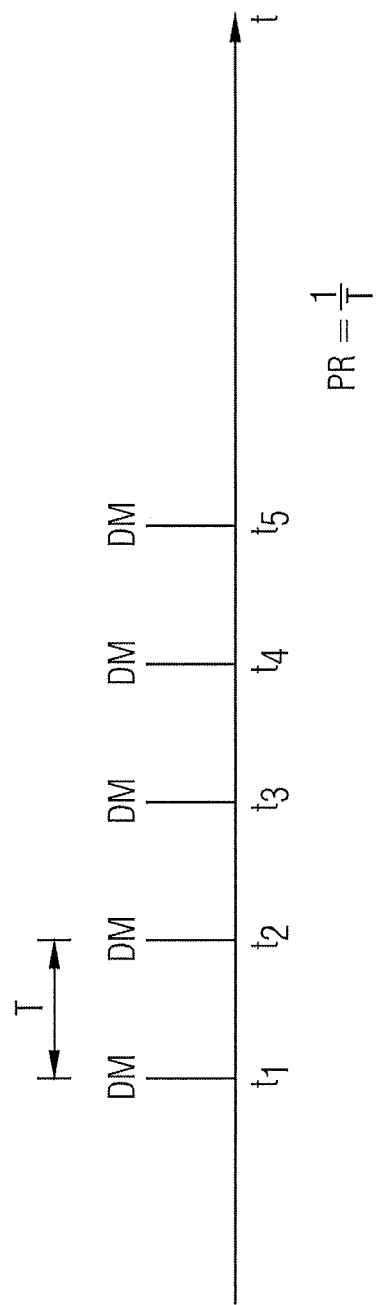
FIG. 19 shows a time diagram for illustrating an exemplary embodiment of a traffic control system and traffic control method according to the present invention.

In a possible embodiment of the traffic control system, TCS, according to the first aspect of the present invention the traffic control system, TCS, employs a proximity service of a 3GPP network. FIG. 1 illustrates a reference architecture by a 3GPP system employed by the traffic control system TCS according to the first aspect of the present invention. Proximity services (ProSe) are formed by services that can be provided by such a 3GPP system based on user equipment devices UE being in proximity to each other. The proximity service function, PSF, of the system illustrated in FIG. 1 is a logical function that can be used for method related actions required for a proximity service. Direct discovery provides the capability of detecting other user equipment devices by a user equipment device UE. By using direct discovery a user equipment UE can search for nearby user equipment devices autonomously. User equipment devices, UE, participating in the device discovery process can transmit periodically discovery messages, DM. In proximity service direct discovery a user equipment UE in the vicinity of another user equipment UE is detected and identified using E-UTRA direct radio signals. E-UTRA is the air interface of a 3GPP long term evolution, LTE, mobile network using the reference architecture as illustrated in FIG. 1. E-UTRA is the air interface for evolved UMTS terretial radio access. E-UTRA stands for the combination of E-UTRA, the user equipment devices UEs and Enode Bs. In a discovery mechanism the user equipment EU can broadcast its presence to other user equipment devices UEs. The traffic control system TCS according to the first aspect of the present invention comprises at least one traffic control unit TCU equipped with a proximity enabled traffic user equipment, PETUE, as illustrated in the block diagram of FIG. 2. The proximity enabled traffic user equipment, PETUE, is adapted to control traffic or movement of at least one mobile entity such as a vehicle equipped with another proximity enabled traffic user equipment PETUE. The proximity enabled traffic user equipment PETUE of the traffic control unit TCU is configured to transmit traffic information by sending at least one discovery message DM directly via a link to the other proximity enabled traffic user equipment PETUE. The discovery message DM is broadcasted by the proximity enabled traffic user equipment PETUE of the traffic control TCU unit and includes a proximity service, ProSe, application identifier comprising a string of traffic labels, TLs, representing hierarchical traffic information levels. The broadcasting proximity enabled traffic user equipment broadcasts direct discovery message DM in a preferred embodiment periodically as also illustrated in FIG. 19. In a preferred embodiment the proximity enabled traffic user equipment PETUE of the traffic control system TCS according to the first aspect of the present invention is in coverage of an evolved node B of an evolved UMTS terretial radio access, E-UTRA, air interface of a mobile network. The transmission resources in the time domain and the frequency domain used for transmission of the discovery message DM in the user equipment to user equipment link are provided by the evolved node B of the E-UTRA air interface within the mobile network as illustrated in FIG. 4. In a possible embodiment the broadcast range BR and/or broadcast signal strength SS of the broadcasted direct discovery message DM is adjustable. In the traffic control system TCS according to the first aspect of the present invention the discovery message DM is broadcasted unidirectional from a source proximity enabled traffic user equipment S-PETUE to other proximity enabled traffic user equipment devices within the broadcast range BR of this source proximity enabled traffic user equipment device. The source proximity enabled traffic user equipment can be for example a proximity enabled traffic user equipment PETUE of a traffic infrastructure control device such as a traffic sign or a traffic light. A receiving proximity enabled traffic user equipment device receiving the broadcasted discovery message DM can be for instance a proximity enabled traffic user equipment of a vehicle VEH moving in the vicinity of the traffic infrastructure device. In the traffic control system TCS according to the first aspect of the present invention the information transport within the broadcasted discovery message DM is unidirectional and there is no bidirectional communication between both proximity enabled traffic user equipment devices PETUE. This diminishes the complexity of the traffic control system TCS and increases its robustness against external influences. Consequently, the traffic control system TCS according to the present invention is reliable and provides a comparatively low additional technical complexity. The proximity enabled user equipment UE is a user equipment UE that supports proximity service requirements and associated procedures. A proximity service enabled user equipment can comprise a non public safety user equipment or a public safety user equipment. By use of the proximity service direct discovery the proximity service enabled traffic user equipment PETUE discovers other proximity service enabled traffic user equipments PETUEs in its vicinity by using capabilities of user equipment devices within the E-UTRA air interface of the LTE network.

Figure 2:
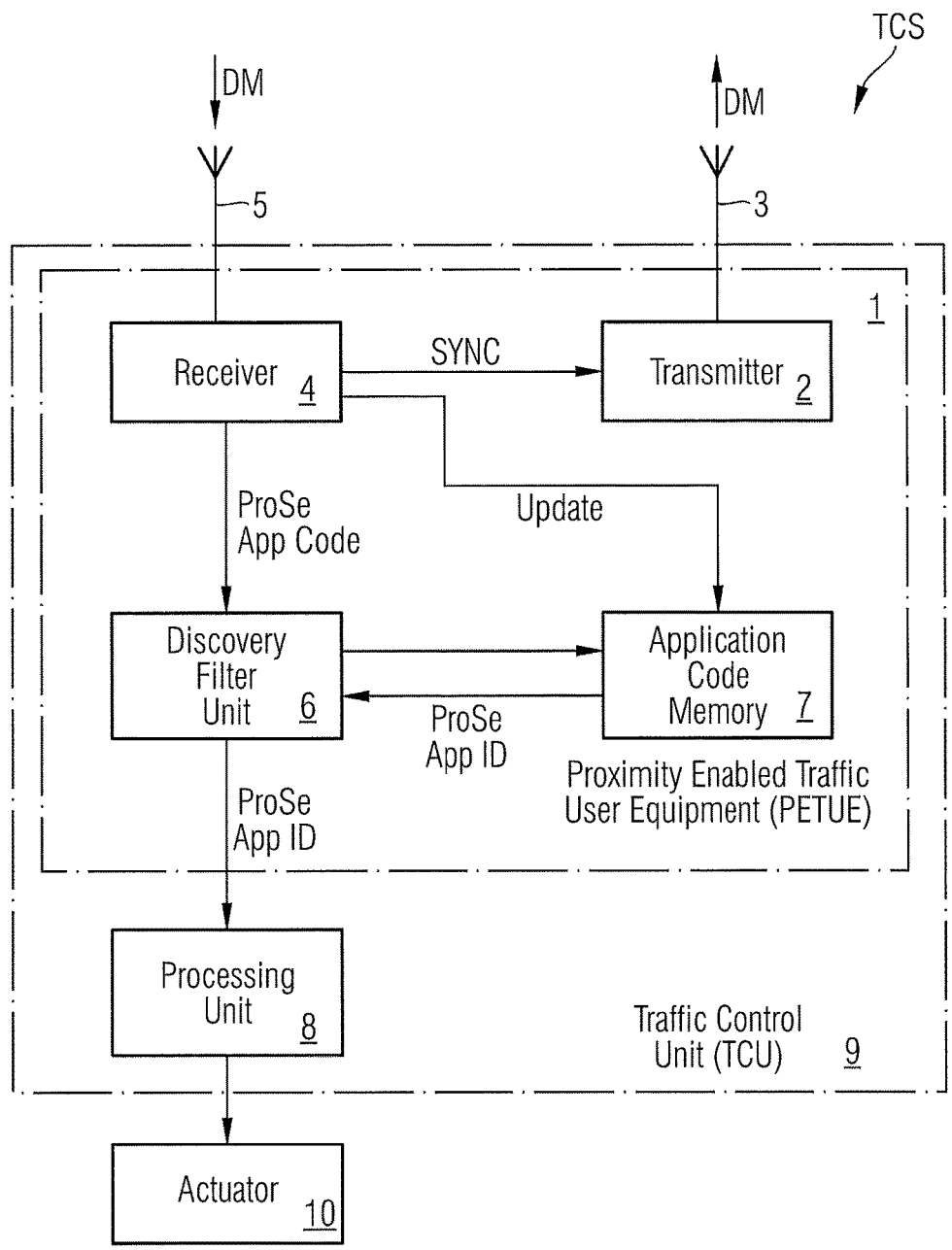
FIG. 2 shows a block diagram of an exemplary embodiment of proximity enabled traffic user equipment within a traffic control unit according to an aspect of the present invention.
Figure 7:
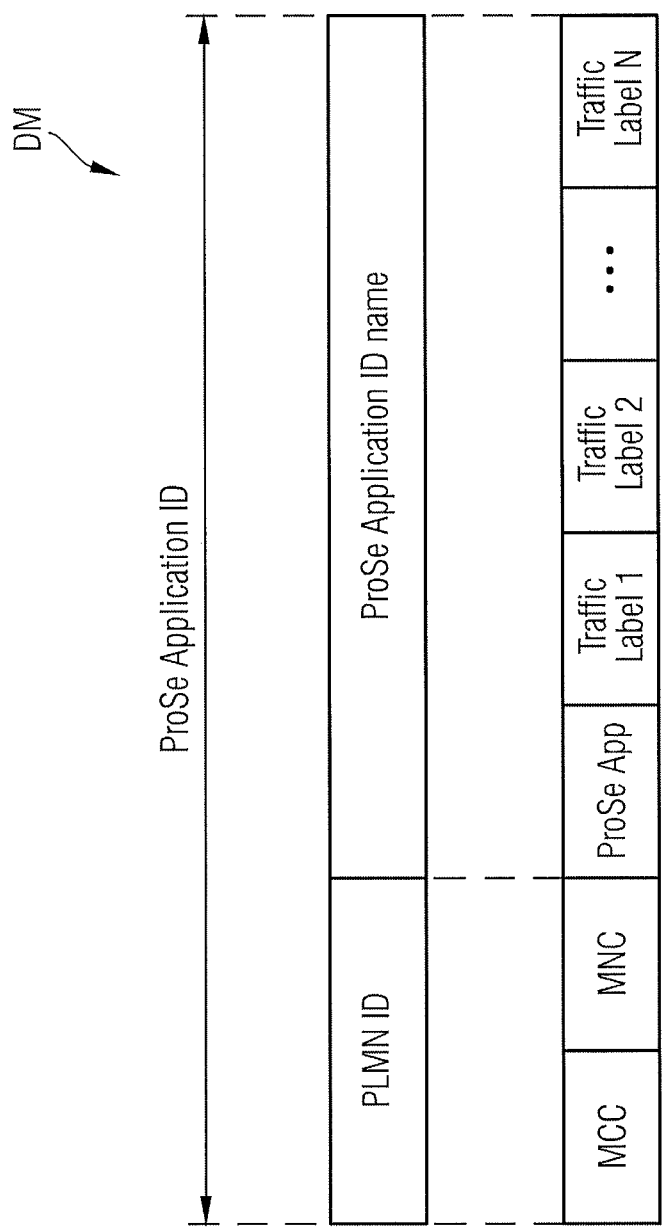
FIG. 7 shows an exemplary data structure of a direct message as employed by the traffic control system and traffic control method according to the present invention.

FIG. 2 shows a block diagram of a possible exemplary embodiment of a proximity enabled traffic user equipment 1 used in a traffic control system TCS according to the first aspect of the present invention. The proximity enabled traffic user equipment, PETUE, 1 comprises in the shown embodiment a transmitter 2 which is adapted to broadcast within a broadcast signal range of the transmitter 2 a proximity service, ProSe, application code provided by a proximity service function PSF and associated with a proximity service application identifier. The proximity service application identifier is an identifier used by the proximity service direct discovery identifying application related information for the proximity service enabled user equipment. Each proximity service application identifier can be globally unique. The proximity service application code is associated with the proximity service application identifier and used in the discovery procedures. The geographic scope of a proximity service application identifier can be specific for a public land mobile network, PLMN, country-specific or even global. FIG. 7 shows a possible exemplary data structure of a proximity service application identifier included in a discovery message DM as used by the traffic control system TCS according to the first aspect of the present invention. The proximity service, ProSe, application identifier comprises a sequence of traffic labels TLs representing hierarchical traffic information levels. The proximity service application identifier further comprises a public land mobile network, PLMN, identifier corresponding to the public land mobile network PLMN that has assigned the proximity service application ID name consisting of the string of traffic labels TLs as illustrated in FIG. 7. The public land mobile network ID can comprise in a possible embodiment a mobile country code MCC and a mobile network code MMC as shown in FIG. 7. To each proximity service, ProSe, application identifier a corresponding proximity service application code is associated which can be obtained in a possible embodiment from a HPLMN proximity service function. The proximity service application code is contained in the discovery message DM that is transmitted over the radio interface by a proximity enabled traffic user equipment PETUE engaged in the proximity service direct discovery procedure to other monitoring proximity enabled traffic user equipment devices PETUEs. The proximity service application code is a number which corresponds at a certain time to a corresponding proximity service application identifier.

Figure 3:
FIG. 3 shows a table for illustrating a possible exemplary embodiment in a lookup table within an application code memory of a proximity enabled traffic user equipment according to an aspect of the present invention.

The proximity enabled traffic user equipment 1 illustrated in FIG. 2 can transmit a discovery message DM with an adjustable signal strength by means of a transmitting antenna 3 via a direct link to at least one other proximity enabled traffic user equipment PETUE in its vicinity. The proximity enabled traffic user equipment 1 further comprises a receiver 4 being connected to a receiving antenna 5, wherein the receiver 4 is adapted to receive a broadcasted proximity service application code associated with a proximity service application identifier. The proximity service application code is supplied by the receiver 4 to a discovery filter unit 6 of the proximity enabled traffic user equipment 1 as shown in FIG. 2. The discovery filter unit 6 has access to an application code memory 7 of the proximity enabled traffic user equipment 1. The discovery filter unit 6 is adapted to selectively match a received proximity service application code with proximity service application codes stored in the configurable lookup application code memory 7 to retrieve the proximity service application identifier of the received discovery message DM. FIG. 3 illustrates schematically a lookup table LUT stored in the application code memory 7 of the proximity enabled traffic user equipment 1. The received proximity service application code is supplied by the discovery filter unit 6 to retrieve the associated proximity service application identifier. The retrieved prosecution service application identifier is then output by the discovery filter unit 6 to a processing unit 8 of a traffic control unit (TCU) 9 comprising the proximity enabled traffic user equipment 1. The traffic control unit 9 can be in a possible embodiment a control unit of an infrastructure control device such as a traffic light. In a possible embodiment the processing unit 8 generates control data or control signals in response to the traffic information data transported in the proximity service application identifier included in the discovery message DM. The control data can be used in a possible embodiment to control an actuator 10 connected to the traffic control unit 9. The actuator 10 can be for example a traffic light or barrier controlled by the traffic control unit 9. The lookup table LUT stored in the lookup application code memory 7 of the proximity enabled traffic user equipment 1 can be configurable or programmable and can be updated by the evolved node B covering the respective proximity enabled traffic user equipment 1. The receiver 4 further can extract a synchronization signal and supply it to the transmitter 2 as shown in FIG. 2. In a possible embodiment of the application code memory 7 can be a replaceable application code memory formed by memory card or the like. By replacing the application code memory 7 a reconfiguration of the proximity enabled traffic user equipment 1 can be achieved. The proximity service application identifier stored in the application code memory 7 as illustrated in FIG. 3 comprises a proximity service application identifier name and optionally a public land mobile network, PLMN, identifier of a public land mobile network PLMN as illustrated in FIG. 7. As shown in FIG. 4 transmission resources TR in the time and/or frequency domain used for broadcasting the discovery message DM via the direct link are provided by the evolved node B of the E-UTRA air interface. In a possible embodiment resources in the time and frequency domain are assigned or dedicated to specific user equipment devices directly. Alternatively, the resources in the time and frequency domain are available to all admitted user equipment devices UEs in a resource pool. Further, the enode B can configure or re-configure the proximity service application code lookup tables LUTs of participating proximity enabled traffic user equipment entities UEs as illustrated in FIG. 4.

Figure 5A:
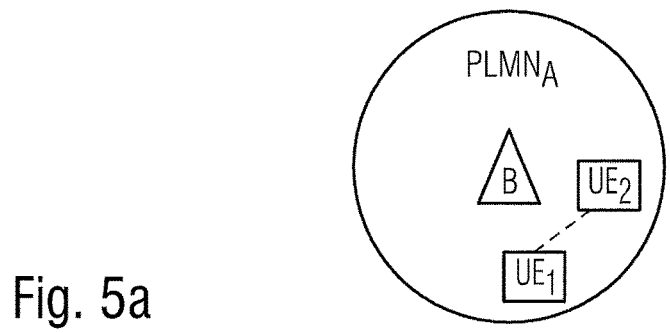
FIG. 5A-5E illustrate a possible coverage status of proximity enabled traffic user equipment devices within a traffic control system according to an aspect of the present invention.
Figure 5B:
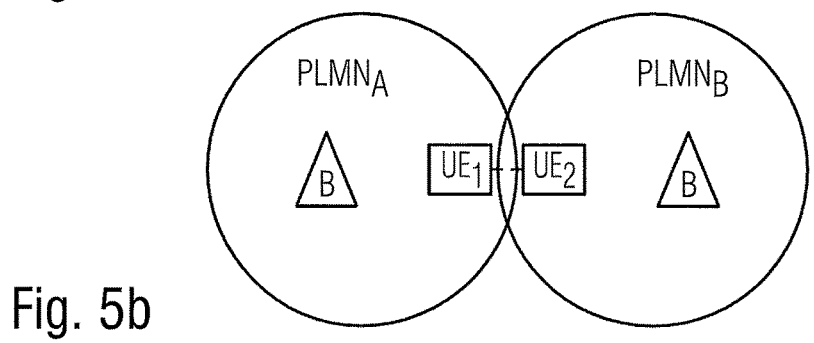
Figure 5C:
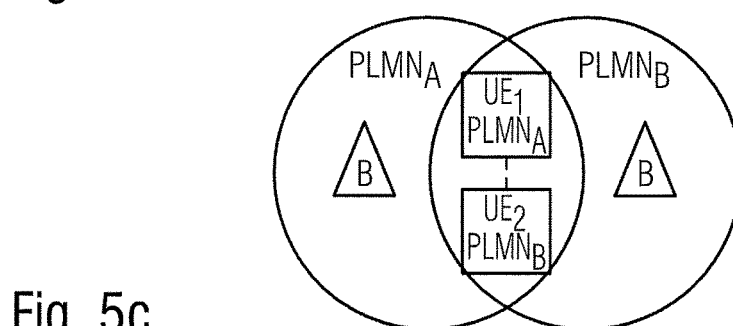
Figure 5D:
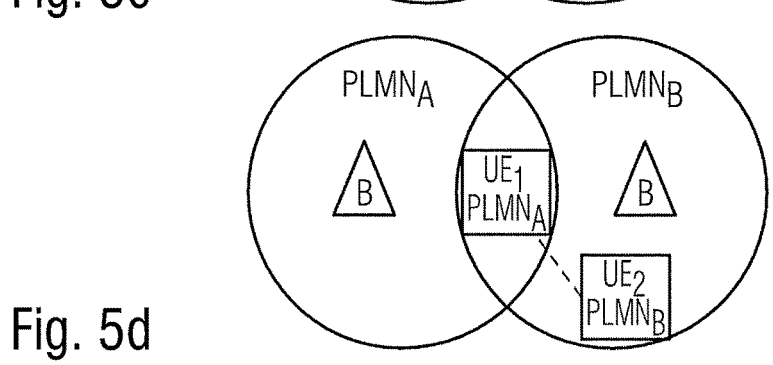
Figure 5E:
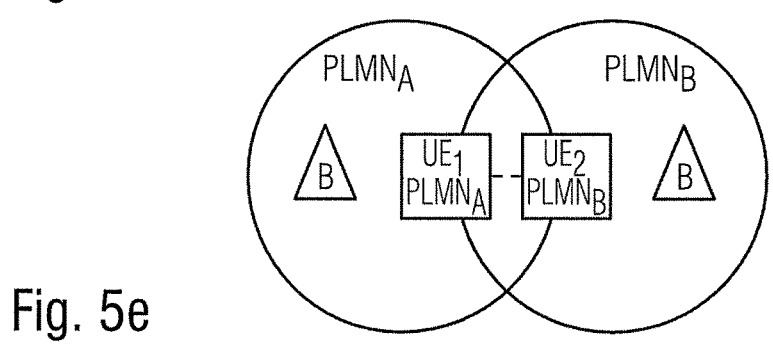

The proximity enabled traffic user equipment device PETUE is in coverage of an evolved enode B of an evolved UMTS terrestial radio access air interface. Different scenarios are illustrated in FIGS. 5a, 5b, 5c and 5d. As can be seen in FIG. 5a both proximity enabled traffic user equipment devices can be in coverage of the same evolved node B of the air interface. It is also possible that both proximity enabled traffic user equipment devices PETUEs are covered by two different evolved node B of the same public land mobile network PLMN as illustrated in FIG. 5b. It is also possible that both proximity enabled traffic user equipment devices PETUEs in are in coverage of two different evolved node Bs of two different public land mobile networks PLMNA, PLMNB as shown in FIGS. 5c, 5d and 5e.

Figure 6:
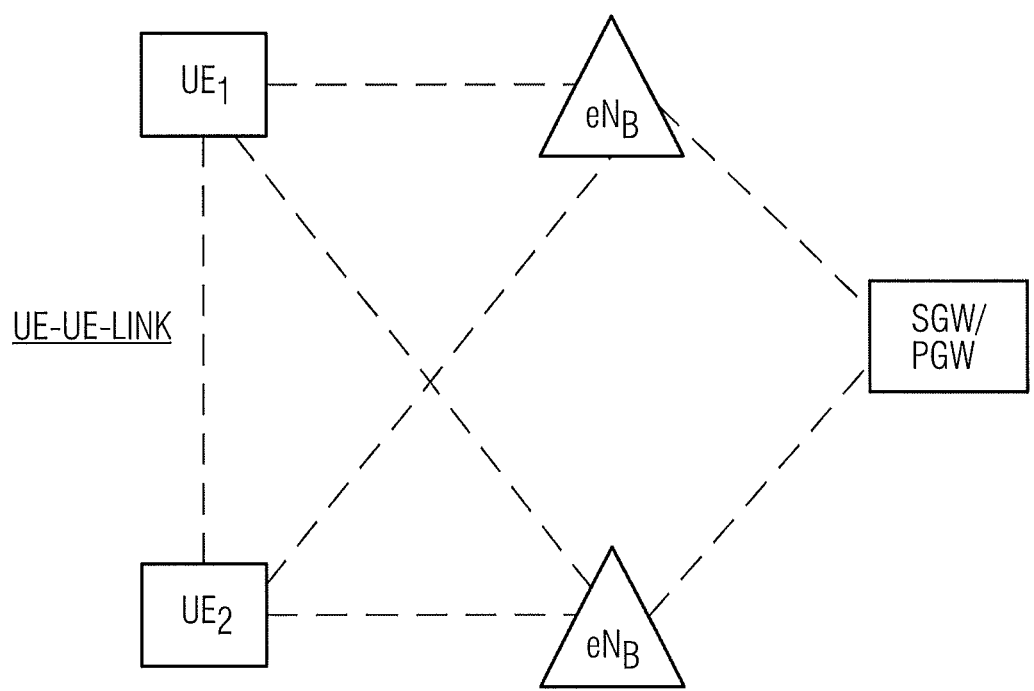
FIG. 6 shows a diagram to illustrating a direct user equipment to user equipment link as employed by the traffic control system and traffic control method according to the present invention.

FIG. 6 shows schematically the user equipment-user equipment direct link between two proximity enabled traffic user equipment devices for transmitting of the discovery message DM.

FIG. 7 shows a possible data structure of a discovery message DM employed by the traffic control system TCS according to the first aspect of the present invention. As can be seen the proximity service, ProSe, application ID comprises a public land mobile network ID of a public land mobile network PLMN as well as a proximity service application identifier name consisting of a sequence of traffic labels TLs carrying traffic information attributes. The proximity service application identifier is composed of a number N of traffic information labels TLs representing hierarchical traffic information levels. The number of traffic labels TLs can vary. The public land mobile network ID is optional and can comprise a mobile country code MCC and a mobile network code MNC as shown in FIG. 7.

Figure 8:
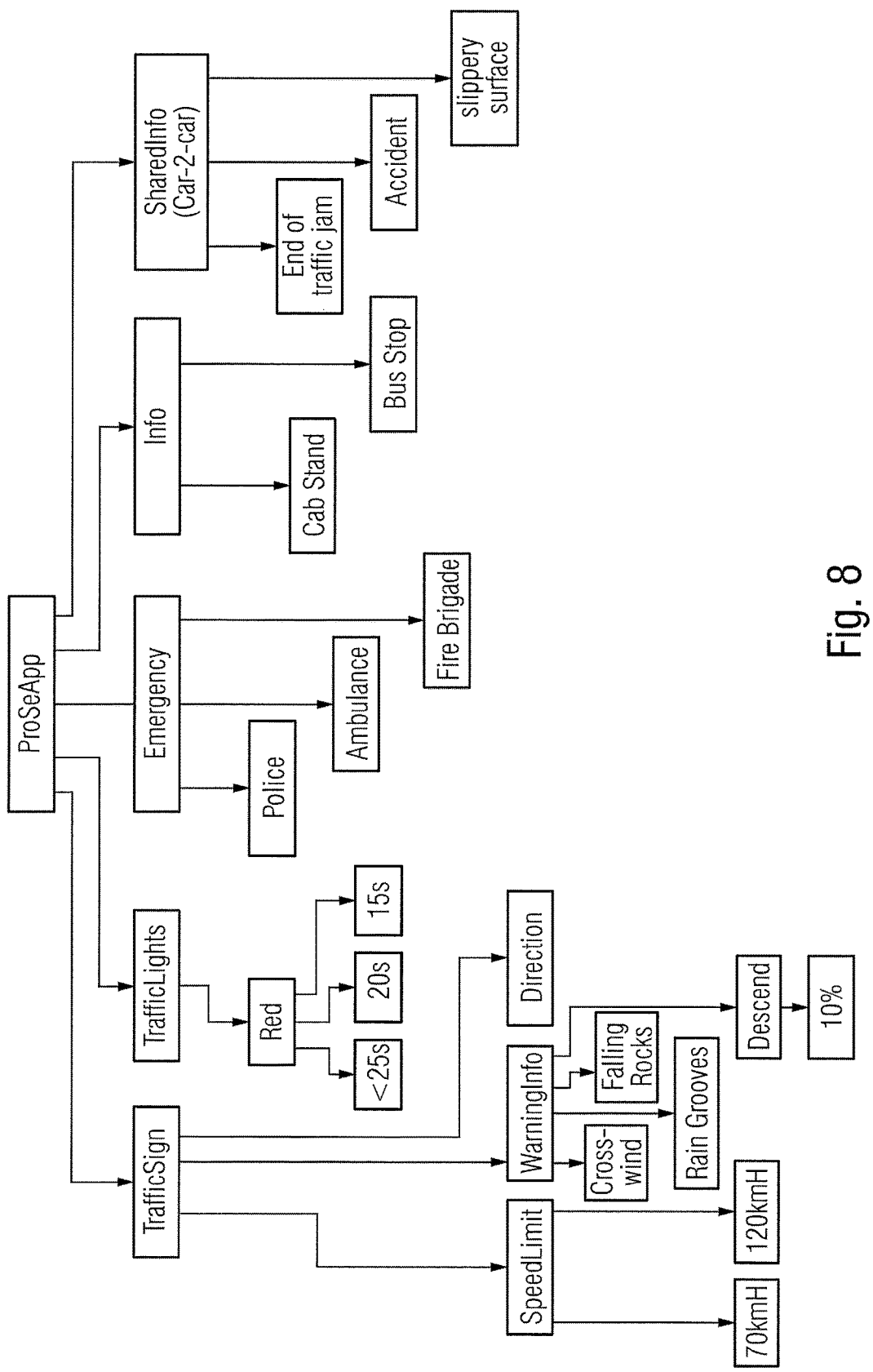
FIG. 8 shows a schematic diagram illustrating possible traffic labels within a discovery message as illustrated in FIG. 7.

FIG. 8 shows schematically the possible composition of a proximity service application identifier name for different exemplary use cases. The proximity service application identifier name can for instance be a sequence of the following traffic labels TLs:

ProSeApp.Traffic Sign.Speed Limit.70 kmh

These traffic labels TLs can be included in a discovery message DM sent by a traffic control unit 9 of a traffic sign along a road indicating that the speed limit of a vehicle travelling on the road is 70 kmh.

Another example of a proximity service application identifier sent by a transmitter of proximity enabled traffic user equipment 1 can be:

ProSeApp.Traffic Light.Red>25 sec.

This proximity service application identifier can be sent within a discovery message DM by the transmitter 2 of a proximity enabled traffic user equipment device 1 within a traffic control unit 9 of a traffic light of a road crossing indicating that the respective traffic light is currently set to red and will remain red for more than 25 s.

Another exemplary proximity service application identifier is: ProSeApp.Emergency.Ambulance.

A discovery message DM having included such a proximity service application identifier can be sent by a transmitter 2 of a proximity enabled traffic user equipment device 1 provided within an ambulance or emergency vehicle.

The hierarchical structure of the traffic information labels TLs provides a predetermined variety of different proximity service application identifiers. In a possible embodiment the string of traffic labels TLs representing hierarchical traffic information levels within the proximity service application identifier of the discovery message DM sent by the proximity enabled traffic user equipment 1 can comprise validity information indicating a validity time, a validity range and/or a validity scope of the traffic information carried in the proximity service application identifier of the discovery message DM. For instance, the following proximity service application identifier name: ProSeApp.Speedlimit.70 kmh.Range.2000 m indicates that the 70 kmh speed limit of the traffic sign is valid only for the next 2000 m along the road.

Further the validity information may indicate a validity scope of the traffic information. For example, the following proximity service application identifier name: ProSeApp.Speedlimit.70 kmh.ValidForLorries indicates that the transported traffic information is only valid for lorries or trucks but not for other vehicles such as cars.

The validity information can also indicate a validity time. For Example, the proximity service application identifier name: ProSeApp.TrafficLight.Red.Validity.15 s indicates that the traffic light is red for the next 15 s.

The discovery filter unit 6 within the proximity enabled traffic user equipment 1 is adapted to selectively match or retrieve the proximity service application identifier of the received discovery message DM. A discovery filter unit 6 without a proximity service application mask can be used for identification of a full match of the service indicated in the proximity service application code. A discovery filter unit 6 with a proximity service application mask allows a partial matching of any parts of the proximity service application code that as are contained in the proximity service application mask. By processing the proximity service application identifier a partial matching can be achieved to control an actuator 10. For instance each proximity service application identifier name comprising the traffic information labels TLs ProSeApp.TrafficLight can be used to inform a driver of a vehicle by means of an optical or acustical signal that the vehicle is approaching a traffic light so that the driver becomes more observant to the coming traffic light. The proximity enabled traffic user equipment, PETUE, 1 can also be implemented in a vehicle such as an ambulance vehicle. For example, the proximity enabled traffic user equipment 1 of an ambulance vehicle can transmit a discovery message DM including a proximity service application identifier name as follows: ProSeApp.EmergencyTraffic indicating that the proximity enabled traffic user equipment, PETUE, 1 is implemented in an ambulance vehicle performing an emergency transport of a person. If such a discovery message DM is received by another proximity enabled traffic user equipment 1 of a traffic light of a road crossing the traffic light is switched automatically to green so that the ambulance vehicle can pass the road crossing.

In the following examples and use cases are illustrated with reference to the enclosed figures for illustrating the operation of a traffic control system TCS according to the first aspect of the present invention.

Figure 9:
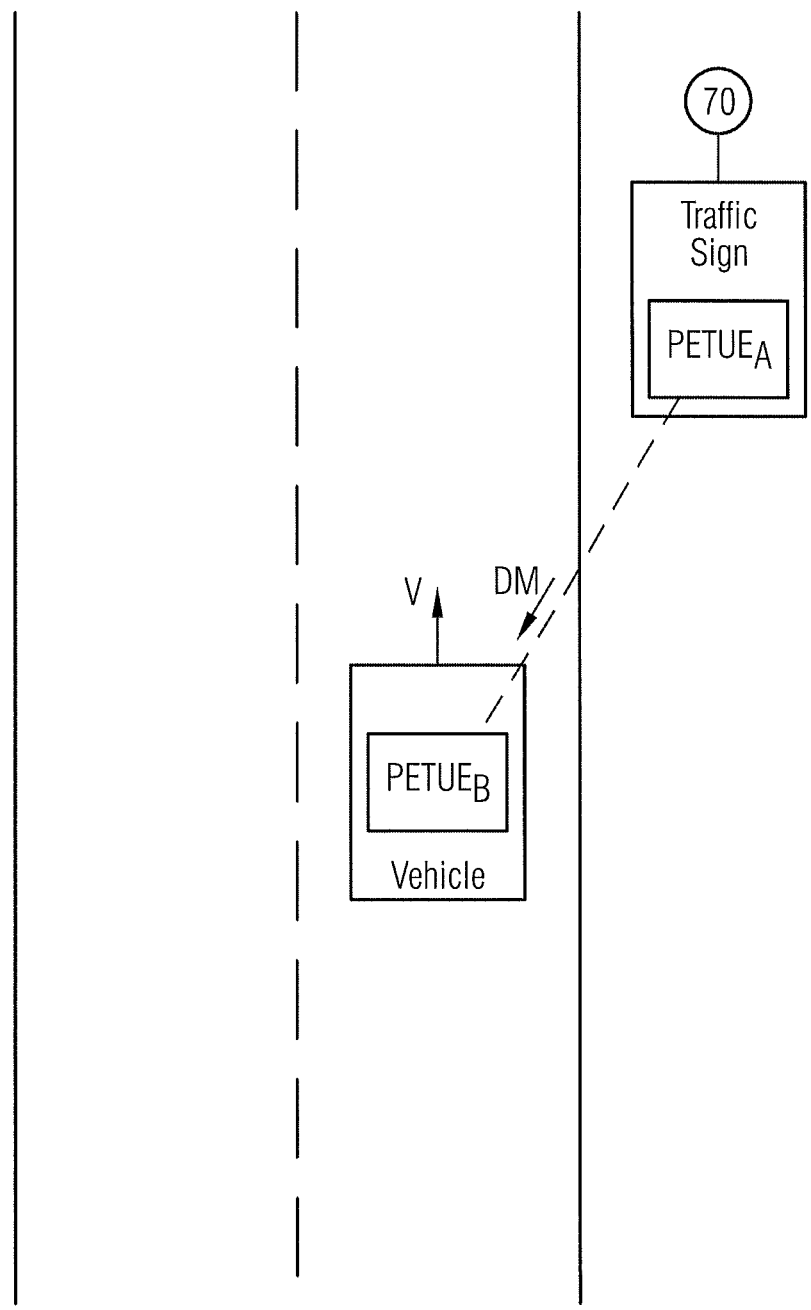
FIG. 9-17 illustrate exemplary use cases for a traffic control system and traffic control method according to the present invention.

FIG. 9 shows as an example a vehicle driving at a speed V on a street and approaching a traffic sign indicating a speed limit of 70 kmh. the traffic sign has a proximity enabled traffic user equipment PETUEA broadcasting a discovery message DM to the proximity enabled traffic user equipment PETUEB of the vehicle. The proximity service application identifier name of the broadcasted discovery message DM can be for instance: ProSeApp.TrafficSign.Speedlimit.70 kmh. When receiving the proximity service application code the discovery filter unit 6 of the receiving proximity enabled traffic user equipment PETUEB can retrieve the corresponding proximity service application identifier from its application code memory 7 wherein the retrieved proximity service application identifier is processed by the processing unit 8. The processing unit 8 can generate control data or control signals in response to the identified proximity service, ProSe, application identifier name. In the given example of FIG. 9 the speed limit of 70 kmh may be displayed to the driver on a display and/or an acoustical or optical announcement by the driver assistance system of the vehicle can be made to the driver so that he becomes aware of the indicated traffic speed limit. In a possible embodiment of the traffic control system TCS the vehicle can be configured to provide an operation mode where the vehicle is automatically slowed down by an actuator 10 to the required maximum speed limit of 70 kmh.

Figure 10:
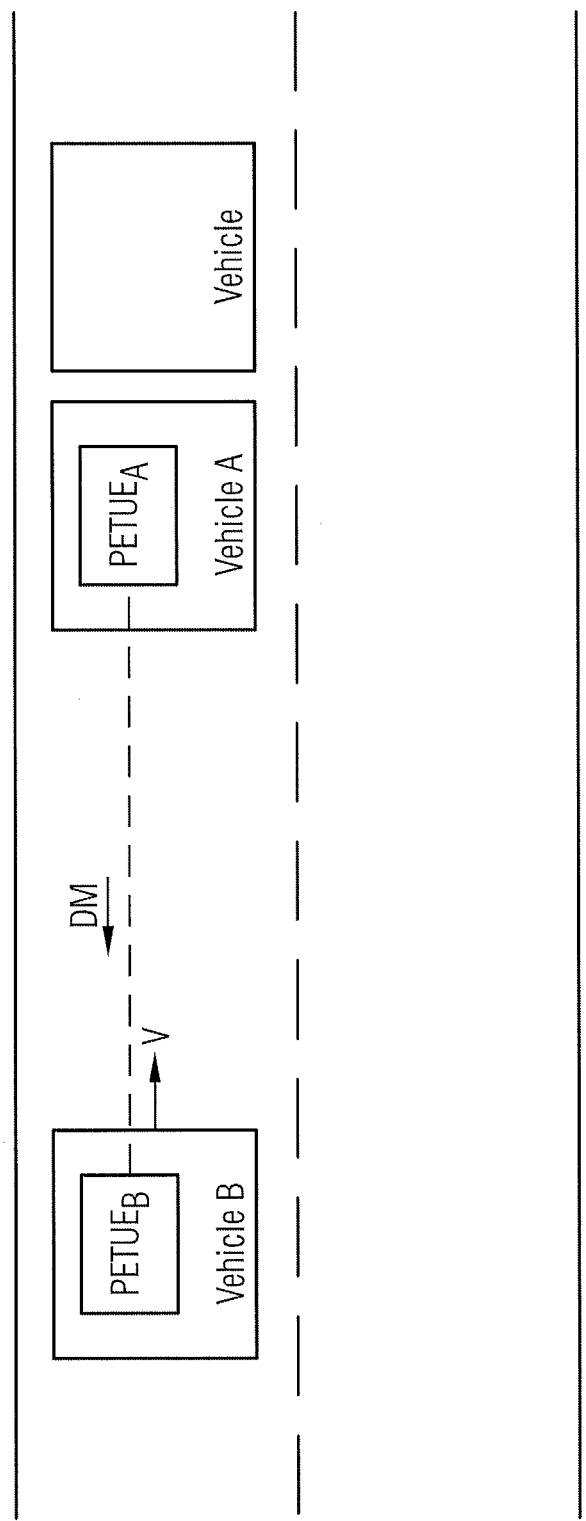

FIG. 10 shows a further example use case where a vehicle B is approaching with a specific speed V a vehicle A standing on a road at the end of a traffic congestion. As soon as the vehicle A analyses from a movement history that it is now standing and forms the end of a traffic congestion or traffic jam its starts to send periodically a discovery message DM that will be received by the proximity enabled traffic user equipment PETUEB of the approaching vehicle B. The proximity service application identifier name of the discovery message can be for example: ProSeApp.Vehicle.traffic congestion.standing.

When receiving the discovery message DM a driver of the approaching vehicle B can receive a warning that his vehicle B is approaching a standing vehicle A forming the end of a traffic jam. The driver of the vehicle B will slow down his vehicle B so that it comes to a stand behind vehicle A on the road forming now a new end of the traffic jam. In a possible embodiment after realizing that the vehicle B forms the new end of the traffic jam the proximity enabled traffic user equipment PETUEB of the vehicle B can be triggered to broadcast now itself a discovery message DM warning other vehicles following vehicle B on the road.

Figure 11:
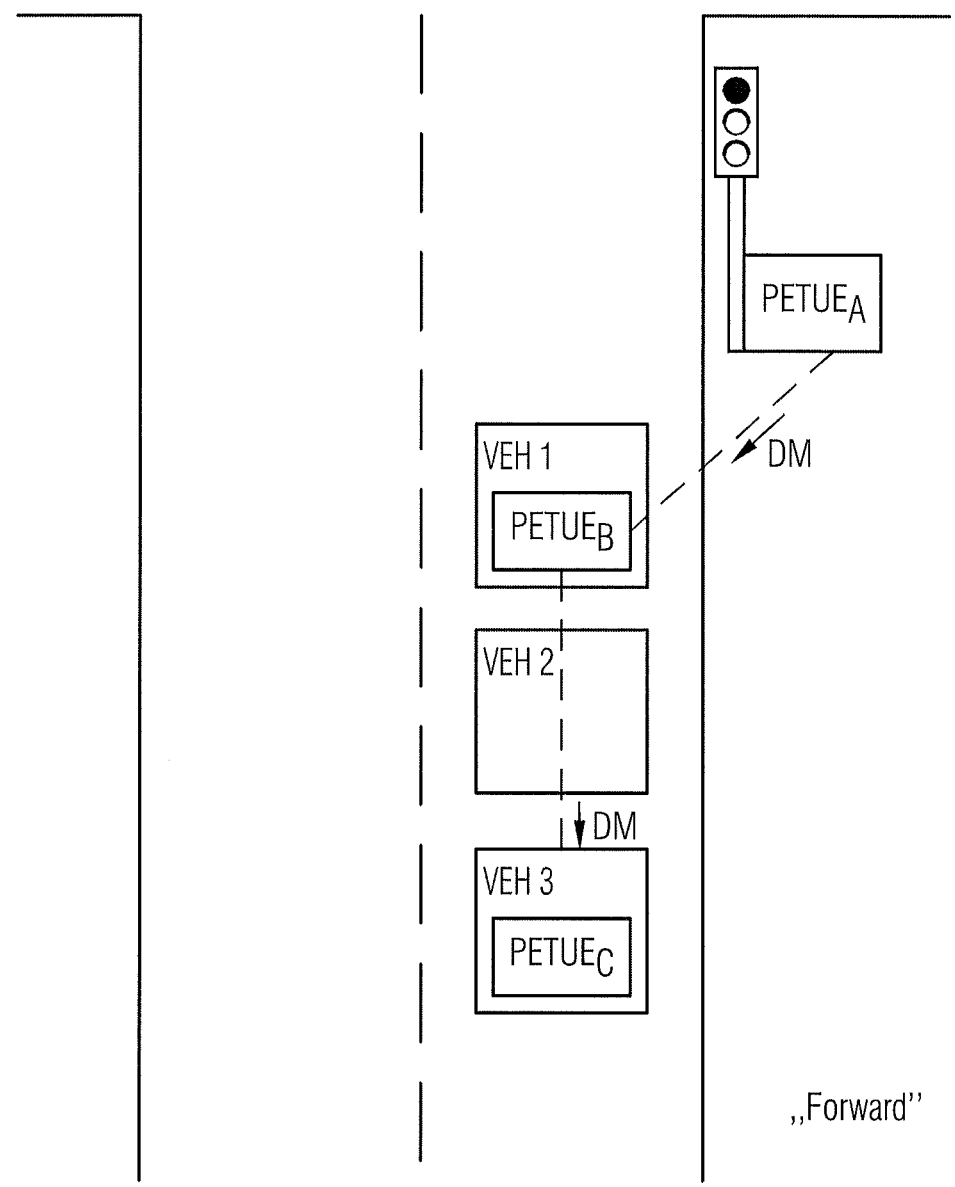

FIG. 11 shows as a further example a number of vehicles standing in front of a traffic light which is red. The proximity enabled traffic user equipment PETUEA of the traffic light informs the first car or vehicle VEH1 in the waiting queue about the traffic light, for instance that the current traffic light will last for another 60 s. The next vehicle VEH2 in the queue is not be equipped with a proximity enabled traffic user equipment so that the third vehicle VEH3 in the queue may be out of range of the transmitter of the proximity enabled traffic user equipment PETUEA of the traffic light. According to a possible embodiment a proximity enabled traffic user equipment PETUE automatically forwards a received discovery message DM to other proximity enabled traffic user equipments PETUEs by broadcasting the received discovery message DM itself. In this way the proximity enabled traffic user equipment PETUEC of the last vehicle VEH3 standing in the queue can receive a discovery message DM in the given example of FIG. 11 from the proximity enabled traffic user equipment PETUEB of the first vehicle VEH1 standing in the queue.

Figure 12:
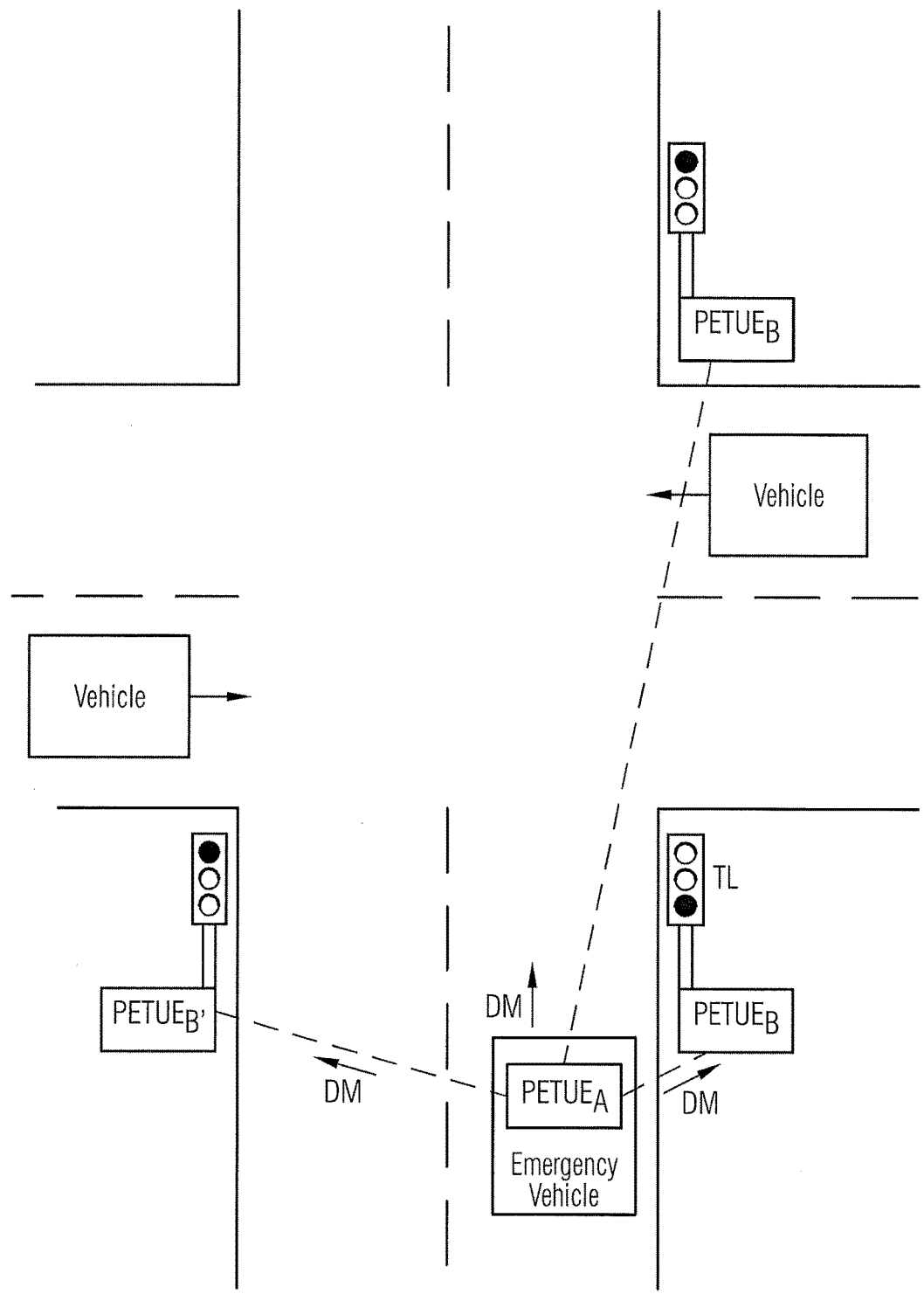

FIG. 12 shows as further use case an emergency vehicle or ambulance approaching a road crossing. The proximity enabled traffic user equipment PETUEA of the ambulance broadcasts a discovery message DM to proximity enabled traffic user equipments PETUEs of the different traffic lights standing at the road crossing so that they are switched accordingly. In the given example the traffic lights are switched such that the ambulance vehicle can pass the road crossing immediately, whereas other vehicles VEH approaching the same road crossing have to wait until the ambulance has passed the road crossing.

Figure 13:
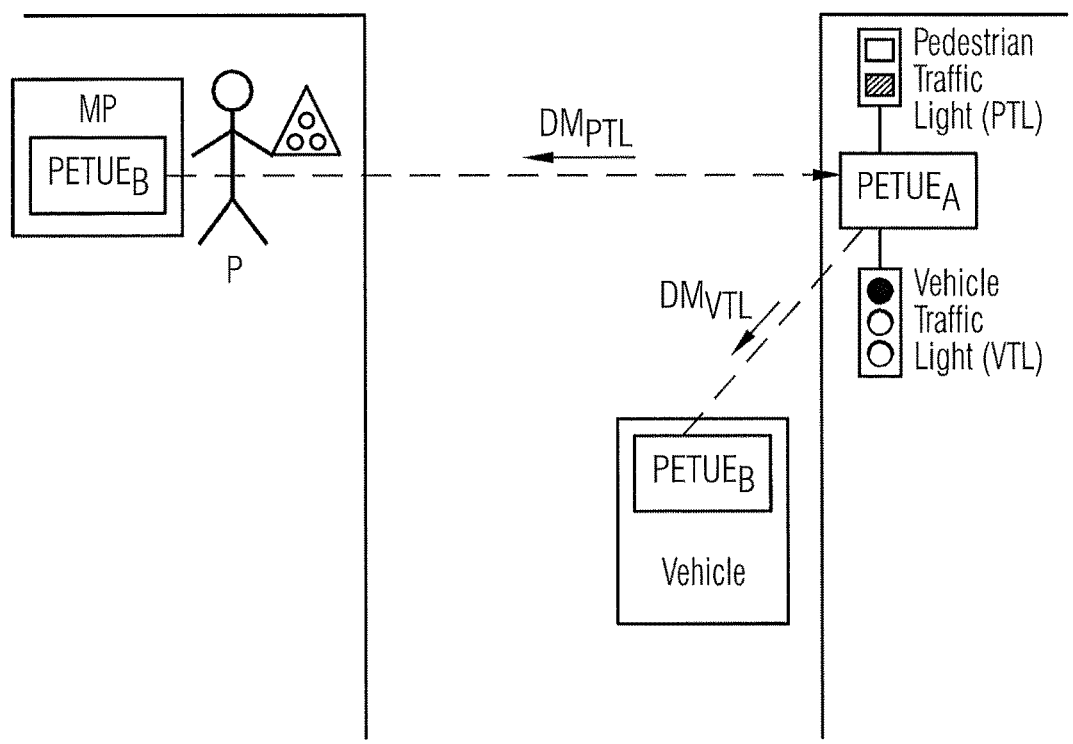

FIG. 13 shows as a further use case a pedestrian P having a mobile phone MP wishing to cross a street having a pedestrian traffic light PTL. For instance, the person P wanting to cross the street may be a blind person having a mobile phone MP with an integrated proximity enabled traffic user equipment PETUE. In a possible embodiment the person P may activate by means of a mobile phone App the proximity enabled traffic user equipment PETUEB to receive discovery messages DM from pedestrian traffic lights PTLs. In the shown example the proximity enabled traffic user equipment A of the pedestrian traffic light PTL is transmitting periodically discovery messages DMs indicating the traffic state of the pedestrian traffic light PTL. In the shown embodiment the pedestrian traffic light PTL is switched to green so that the proximity enabled traffic user equipment PETUEB of the mobile phone MP handheld by the blind person P can receive a proximity service application identifier name as follows: ProSeApp.TrafficLight.PedestrianTrafficLight.Green.30 s indicating that the pedestrian traffic light PTL is green and will remain green for 30 seconds. The processing unit 8 of the mobile phone MP can interpret the retrieved proximity service application identifier and inform the blind person P by a loud speaker of the mobile phone MP that he can pass the pedestrian traffic light PTL in the next 30 seconds. In the given example of FIG. 13 the proximity enabled traffic user equipment PETUEA can also be coupled to a vehicle traffic light VTL. The proximity enabled traffic user equipment PETUEA can send via another link a further discovery message DMVTL to another proximity enabled traffic user equipment PETUEB' of a vehicle VEH in front of the vehicle traffic light VTL which is switched to red as illustrated in FIG. 13.

Figure 14:
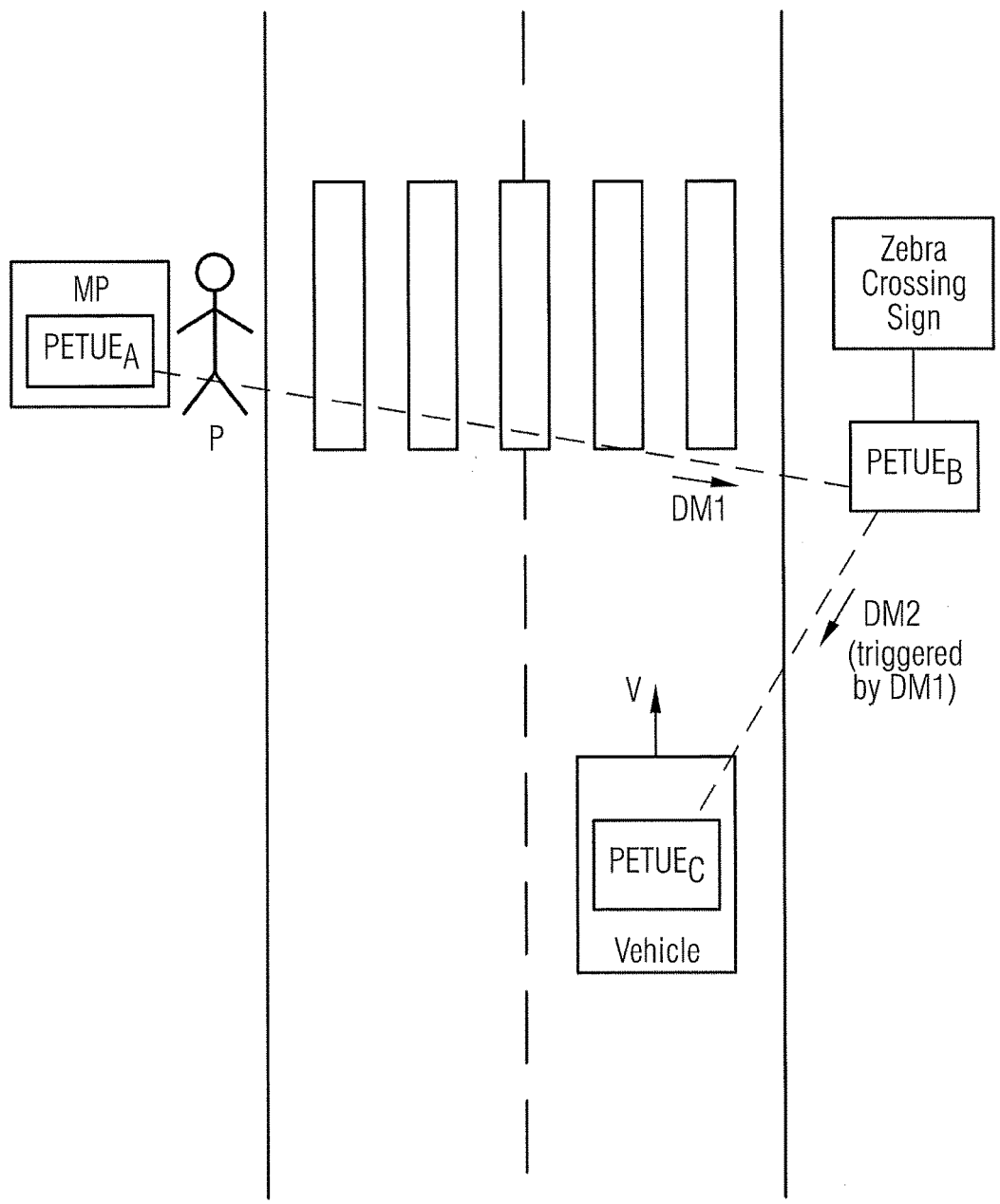

FIG. 14 shows a further example illustrating a cascade of discovery messages DM1, DM2 via a chain of proximity enabled traffic user equipment devices PETUEs. In the shown example a person P having a mobile phone MP is approaching a zebra crossing having a zebra crossing traffic sign equipped with a proximity enabled traffic user equipment PETUEB. The mobile phone MP of the person P is equipped with a proximity enabled traffic user equipment PETUEA broadcasting a discovery message DM periodically indicating that the pedestrian P is approaching. As soon as the proximity enabled traffic user equipment PETUEB of the zebra crossing traffic sign receives the discovery message DM1 from the mobile phone MP of the person P another discovery message DM2 is triggered and broadcasted which can be received by a proximity enabled traffic user equipment PETUEC of a vehicle VEH moving towards the zebra crossing as illustrated in FIG. 14. In this way the driver of the vehicle VEH is informed that he is not only approaching a zebra crossing but also that a person P is currently crossing the zebra crossing.

Figure 15:
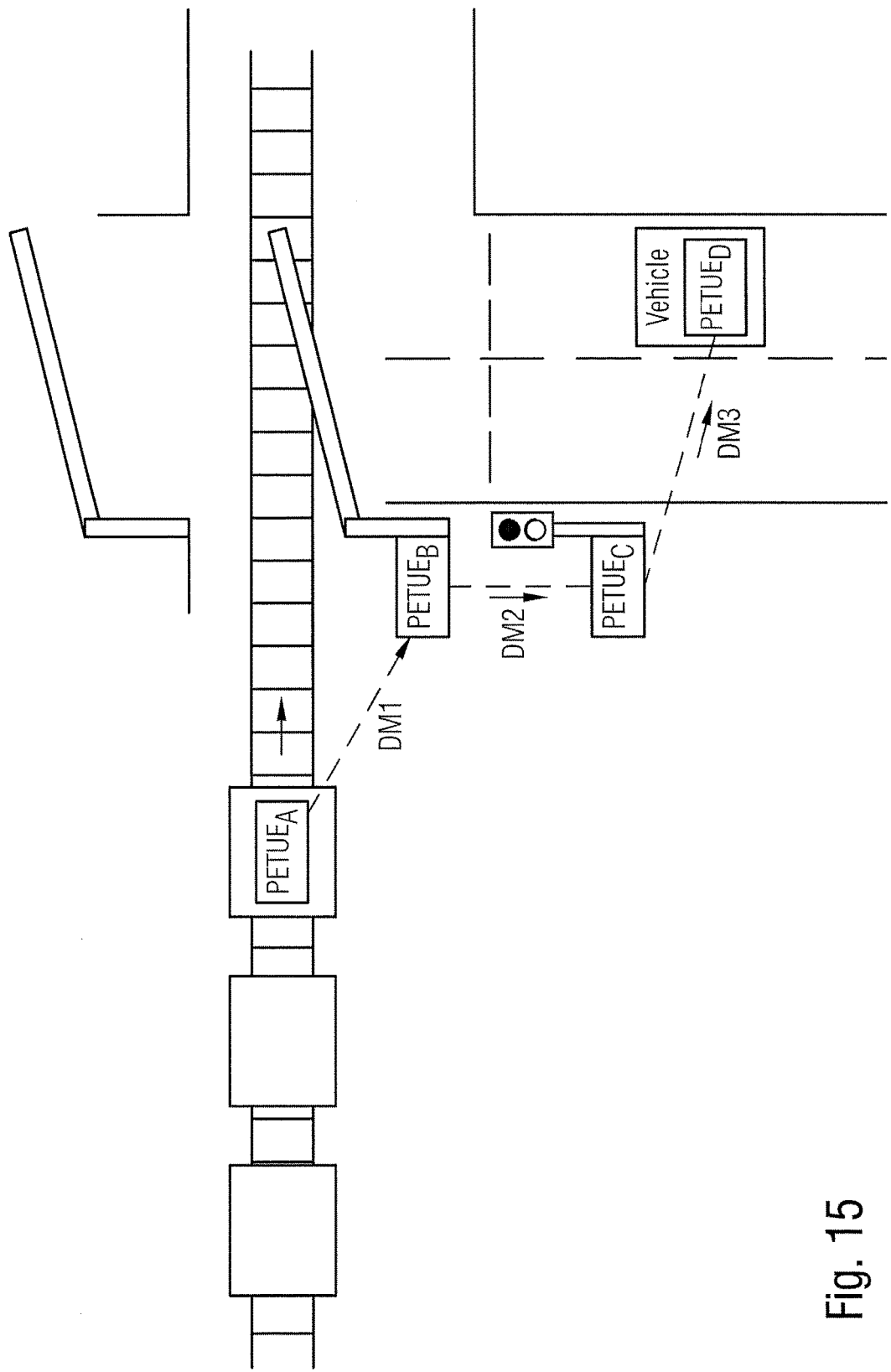

FIG. 15 shows a further example for a triggered chain of discovery messages DM when a train is approaching a crossing street. The train comprises a proximity enabled traffic user equipment PETUEA broadcasting periodically discovery messages DM1, which can be received by a proximity enabled traffic user equipment PETUEB of a barrier. As soon as the barrier receives the broadcasted first discovery message DM1 from the train it is closed automatically and sends a triggered second discovery message DM2 to the proximity enabled traffic user equipment PETUEC of a traffic light in front of the barrier being switched to red. The proximity enabled traffic user equipment PETUEC of the traffic light can in turn generate a third discovery message DM3 broadcasted and received by the proximity enabled traffic user equipment PETUED of an approaching vehicle VEH informing the driver of the vehicle about the red traffic light and the closed barrier.

Figure 16:
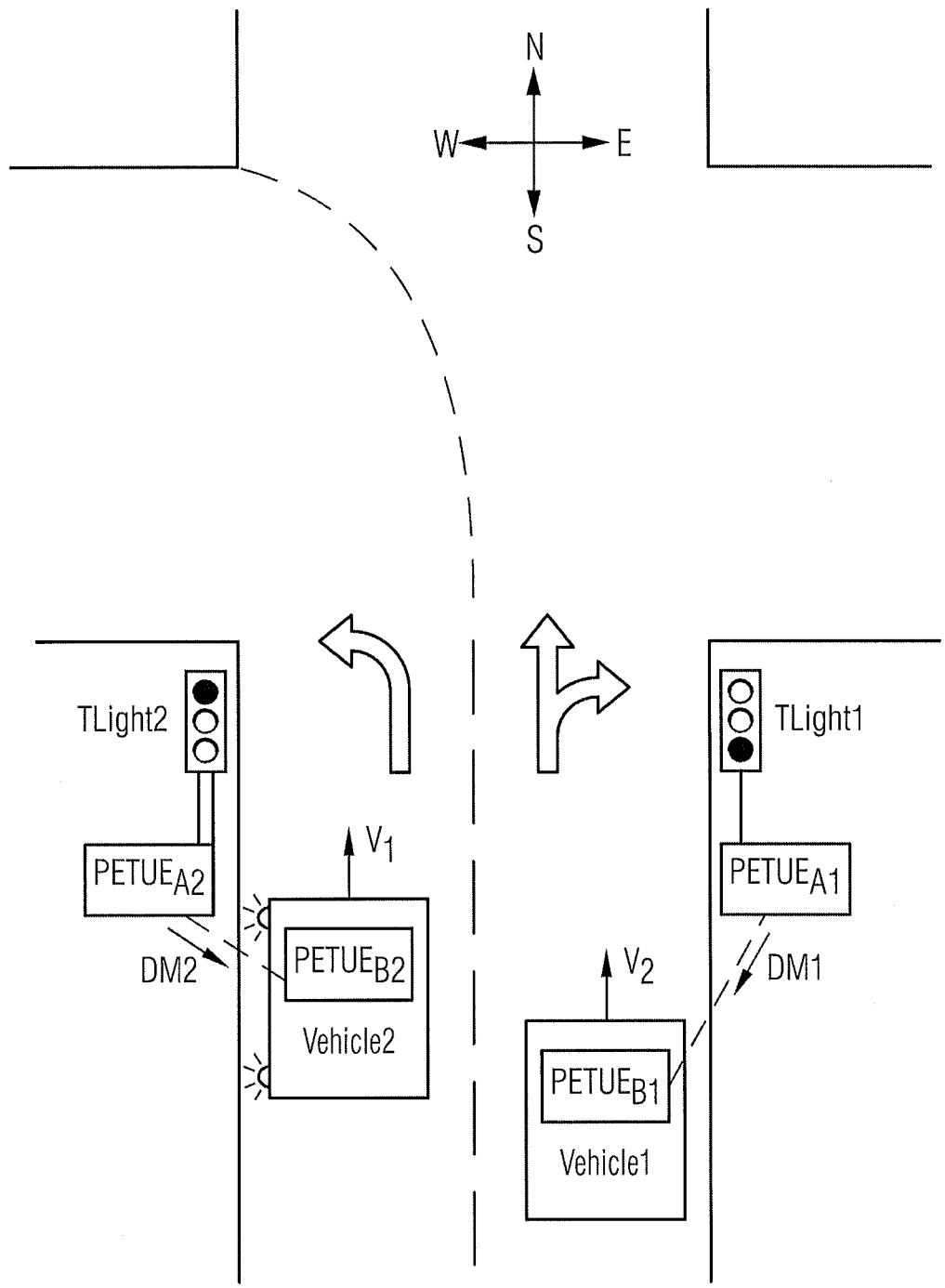
Figure 20:
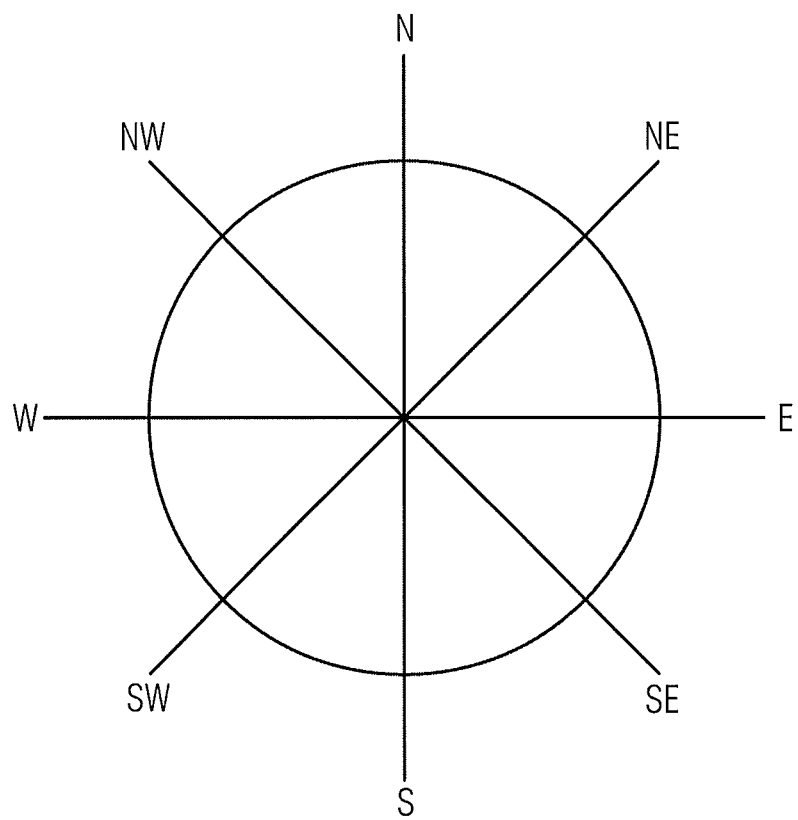
FIG. 20 shows a schematic diagram for illustrating traffic direction information data as used in a possible specific embodiment of the traffic control system and traffic control method according to the present invention.

FIG. 16 shows a further possible embodiment of a traffic control system TCS according to the first aspect of the present invention. In a possible embodiment the string of traffic labels TLs representing hierarchical traffic information levels within the proximity service application identifier of the discovery message DM sent by a proximity enabled traffic user equipment PETUE comprises traffic direction information indicating a current and/or a future moving direction of a proximity enabled traffic user equipment PETUE. In the shown example two vehicles on the same street are approaching a road crossing with two traffic lights, i.e. a traffic light TLight1 and traffic light TLight2 wherein the first traffic light TLight1 is provided for the right lane of the street and the other traffic light TLight2 is provided for the left lane of the street. Both traffic lights comprise a proximity enabled traffic user equipment PETUEA1 and PETUEA2 wherein a first discovery message DM1 is broadcasted by the first proximity enabled traffic user equipment PETUEA1 of the first traffic light to a receiving proximity enabled traffic user equipment PETUEB1 of the first vehicle VEH1 and wherein a second proximity enabled traffic user equipment PETUEA2 of the second traffic light is sending a discovery message DM2 to the receiving proximity enabled traffic user equipment PETUEB2 of the second vehicle VEH2 driving on the left lane. In the given example the first traffic light TLight1 is switched to green and the second traffic light TLight2 for the left turning lane is switched to red. Accordingly, the first discovery message DM1 transports a proximity service application identifier name indicating the traffic light is green (ProSeApp.TrafficLight-.Green) and the second discovery message DM2 transports a proximity service application identifier name indicating that the traffic light is red (ProSeApp.TrafficLight.Red). Since the broadcasting ranges of the two traffic lights may overlap the two vehicles VEH1, VEH2 may receive both discovery messages DM1, DM2. To avoid conflicts and misinterpretations the traffic label TL string comprises in a preferred embodiment also traffic direction information indicating for instance a current and/or a future direction. For example, FIG. 16 shows two vehicles VEH1, VEH2 driving in north direction (N.), wherein the current direction as well as the intended future direction of the first vehicle VEH1 is north (N.) while the current direction of the second vehicle VEH2 is north (N.) but the future intended direction of the vehicle VEH2 is west (W.). Accordingly, the discovery method DM2 broadcasted by the proximity enabled traffic user equipment PETUEA2 of the second traffic light TLight2 can indicate that it is only valid for vehicles with the current direction north (N.) and the future direction west (W.). For example, the discovery message DM2 of the second traffic light TLight2 can comprise a proximity service application identifier name as follows: ProSeApp.TrafficLight.red.10 seconds.current direction N. future direction W. In a possible embodiment of the traffic control system TCS according to the first aspect of the present invention the traffic direction information can comprise eight different directions (N., W., S., E., NW., SW., NE., SE.) as illustrated in FIG. 20.

Figure 17:
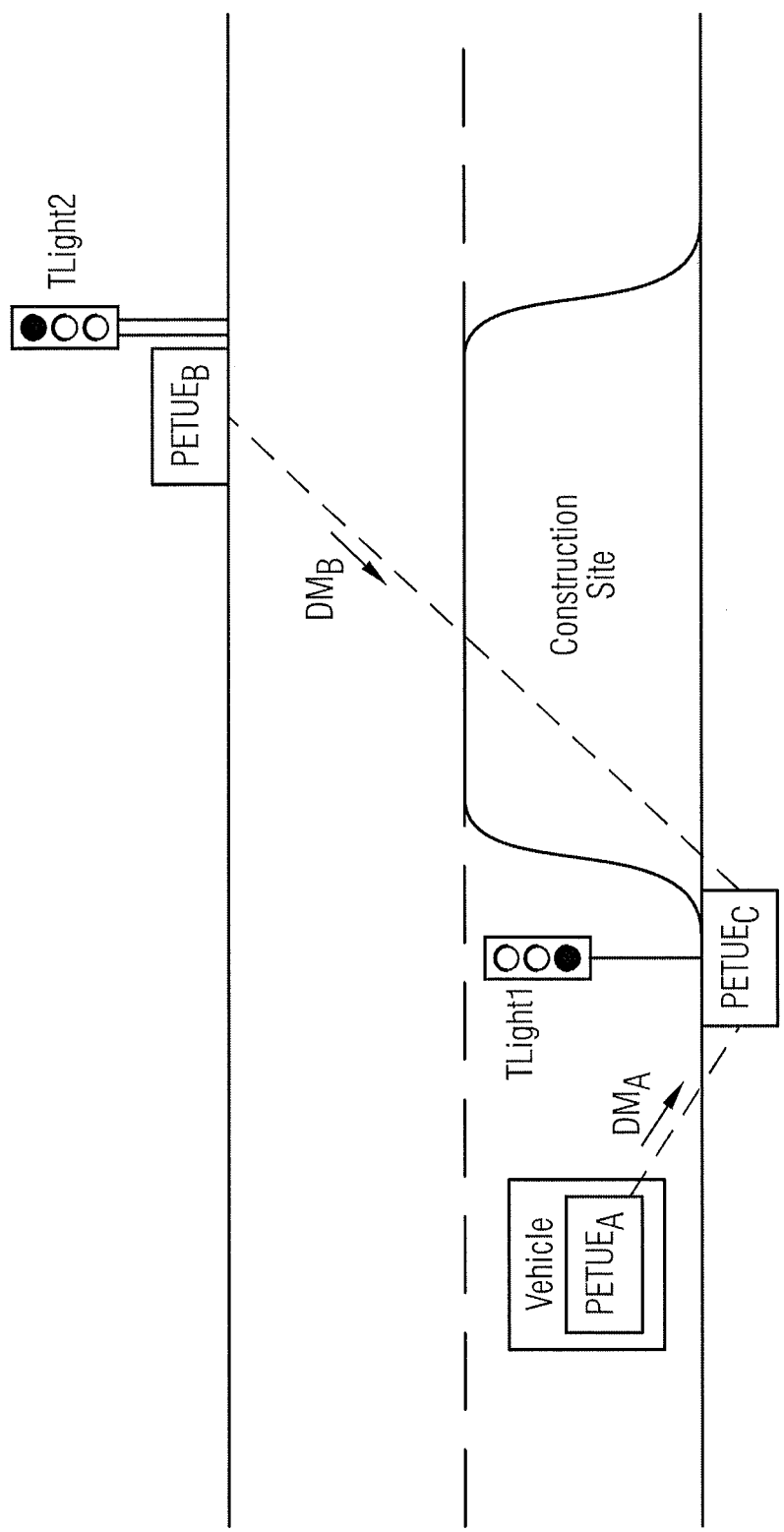

FIG. 17 shows a further exemplary use case of a vehicle VEH comprising a proximity enabled traffic user equipment PETUEA approaching a traffic light setup temporarily at a construction site of a road. The construction site of the road is narrowed to a single lane so that the vehicle VEH can only pass if the setup construction site traffic light is green. At both ends of the construction site at traffic light is setup each having a proximity enabled traffic user equipment PETUE. In the given example the vehicle VEH is approaching the construction site at one end whereas no vehicle is approaching the construction site at the other end. The vehicle VEH comprises a proximity enabled traffic user equipment PETUE broadcasting periodically a discovery message DMA indicating that the vehicle is standing in front of the first traffic light to the proximity enabled traffic user equipment PETUEC of the first TLight1. The proximity enable traffic user equipment PETUEC further receives from the proximity enabled traffic user equipment PETUEB of the other traffic light TLight2 information via a discovery message DMB that no vehicle is approaching the other traffic light TLight2. After interpreting both proximity service application identifier names of the received discovery messages DMA, DMB the processing unit possessing the received proximity service application identifier names sends a control signal to the first traffic light TLight1 so that it is automatically switched to green allowing the vehicle VEH to pass the construction site without waiting. Accordingly, it can be seen in FIG. 17 that a vehicle VEH comprising a system including a proximity enabled traffic user equipment PETUE of the traffic control system TCS can provide advantages to the driver of the vehicle with such a user equipment device.

FIGS. 18a, 18b, 18c show different scenarios for handling discovery messages DM by a proximity enabled traffic user equipment device. As can be seen in FIG. 18a the received discovery message UM can be simply forwarded by the receiving proximity enabled traffic user equipment PETUE by broadcasting the received discovery message DM to other proximity enabled traffic user equipments PETUEs. This can be useful, for instance, in a situation as illustrated in FIG. 11, i.e. in a waiting queue in front of a traffic light.

Further, as illustrated in FIG. 18b the broadcasted discovery message DM can trigger as cascade of discovery messages DMs with different proximity service application identifiers as illustrated in the examples of FIG. 14 or FIG. 15.

Moreover, as shown in FIG. 18 discovery messages DMs received by a proximity traffic user equipment PETUE from different source proximity enabled traffic user equipments to can evaluated or logically combined to trigger a specific discovery message DM with a specific proximity service application identifier name or to generate a specific control signal as illustrated in the example of FIG. 17.

In a possible embodiment the discovery message DM is broadcasted by the proximity enabled traffic user equipment PETUE periodically as illustrated in FIG. 19. The broadcast period T can be in a possible embodiment be fixed or pre-configured. In a further possible embodiment the broadcast period T corresponding to a broadcast repetition rate RR (RR=1:T) can be adjusted. In a possible embodiment the broadcast repetition rate RR of the discovery message DM is adjusted depending from the application identifier of the broadcasted discovery message. For instance, a discoverage message DM with high importance or priority can be broadcasted with a higher broadcast repetition rate RR than a proximity service application identifier of less importance. Further, the broadcast repetition rate RR can be adjusted in a further embodiment automatically depending on the moving speed V of the proximity enabled traffic user equipment PETUE broadcasting the respective discovery message DM. The vehicle VEH such as a train approaching barrier with a high speed VH can broadcast the discovery message DM in a preferred embodiment with a higher broadcast repetition rate RR than when approaching the barrier with a very low speed VL. Also the signal strength SS and/or the broadcast range BR of the broadcasted discovery message DM can be adjusted in a possible embodiment depending on the proximity service application identifier name transported in the discovery message DM and/or depending on the moving speed V of the proximity enabled traffic user equipment broadcasting PETUE broadcasting the discovery message DM.

The traffic control system TCS according to the first aspect of the present invention can comprise a plurality of different traffic control units TCUs in particular infrastructure traffic control units of traffic infrastructure entities such as traffic signs or traffic lights. The traffic control unit 9 of the traffic control system TCS as illustrated in FIG. 2 can also comprise a vehicle control unit of a vehicle such as a truck, car, bus a motorbike, a bicycle or train. Vehicles VEH can comprise any kinds of vehicles, in particular vehicles with specific purpose such as emergency vehicles or ambulance vehicles. The traffic control unit can also be formed by a mobile device control unit of a handheld mobile device in particular a mobile phone MP.

The invention further relates to a method for providing a traffic control wherein traffic information is transported in a discovery message DM broadcasted by a proximity enabled traffic user equipment PETUE via a user equipment-user equipment link to another proximity enabled traffic user equipment. The discovery message DM includes a proximity service application identifier comprising a string or sequence of traffic information labels TLs representing hierarchical traffic information levels. The method can be implemented by a program comprising instructions performing the method steps. The transport of traffic information within proximity service application names of discovery messages DM is very robust and reliable. It can be implemented by devices without significant additional technical efforts. An existing traffic control system can be upgraded by implementing additional proximity enabled traffic user equipments. Proximity enabled traffic user equipments PETUEs provided within vehicles VEH such as cars can be supplied with energy by a battery of the vehicle VEH. Proximity enabled traffic user equipments PETUE located at a traffic control unit of a traffic infrastructure entity such as a traffic light can also be supplied with energy from the same energy source feeding the traffic light. Isolated traffic signs along a road equipped with a proximity enabled traffic user equipment PETUE can be supplied with electric power of a local battery or generated by a photovoltaic panel since the broadcasting of discovery messages DMs consumes only little electrical power. The proximity enabled traffic user equipment PETUE can provide proximity service, ProSe, application identifier names which can be evaluated by an existing navigation system of a vehicle VEH to increase its functionality. The traffic control system TCS can be used to provide increased security and/or efficiency in a variety of traffic situations as illustrated in the above exemplary embodiments and can be configured for active road safety applications such as collision warning or road work warning. The system and method according to the present invention can be implemented for safety applications vehicle to vehicle, vehicle to pedestrian and/or vehicle to infrastructure.

REFERENCE SIGNS

PETUE Proximity Enable Traffic User Equipment
TCS Traffic Control Systems
TCU Traffic Control Unit
VEH Vehicle
TL Traffic Label
DM Discovery Message
LUT Look up Table
1 Proximity Enable Traffic User Equipment
2 Transmitter
3 Transmitter antenna
4 Receiver
5 Receiver antenna
6 Discovery filter unit
7 Application code memory
8 Processing Unit
9 Traffic control unit
10 Actuator

The invention claimed is:
1. A traffic control system comprising:
at least one traffic control unit equipped with a proximity enabled traffic user equipment and adapted to control traffic of mobile entities; and
an actuator connected to said traffic control unit;
wherein the proximity enabled traffic user equipment of said traffic control unit comprises:
a transmitter adapted to transmit traffic information by broadcasting at least one discovery message to at least one other proximity enabled traffic user equipment of a mobile entity in a vicinity of the proximity enabled traffic user equipment of said traffic control unit to discover the other proximity enabled traffic user equipment, and
a receiver adapted to receive a broadcasted proximity service application code associated with a proximity service application identifier,
wherein the broadcasted proximity service application code is supplied by said receiver of the proximity enabled traffic user equipment to a discovery filter unit of said proximity enabled traffic user equipment,
wherein said discovery filter unit is adapted to selectively match the broadcasted proximity service application code with proximity service application codes stored in a configurable lookup application code memory of said proximity enabled traffic user equipment to retrieve a matching proximity service application identifier of a discovery message received by the receiver of said proximity enabled traffic user equipment,
wherein the matching proximity service application identifier comprises a string of traffic labels carrying traffic information attributes, and
wherein the traffic control unit of said traffic control system further comprises a processing unit adapted to process the matching proximity service application identifier output by said discovery filter unit of said proximity enabled traffic user equipment to generate control data adapted to control the actuator connected to the traffic control unit of said traffic control system.

2. The traffic control system of claim 1, wherein the transmitter of said proximity enabled traffic user equipment is adapted to broadcast within a broadcast range of the transmitter a proximity service application code provided by a proximity service function and associated with a proximity service application identifier.

3. The traffic control system of claim 1, wherein the matching proximity service application identifier output by the discovery filter unit of said proximity enabled traffic user equipment is processed by the processing unit of said traffic control unit to generate control data in response to the traffic information attributes carried by the string of traffic labels of the matching proximity service application identifier.

4. The traffic control system of claim 3, wherein the matching proximity service application identifier comprises a proximity service application identifier name composed of the string of traffic labels carrying traffic information attributes and further comprises a public land mobile network identifier of a public land mobile network.

5. The traffic control system of claim 1, wherein a lookup table stored in the lookup application code memory of the proximity enabled traffic user equipment is configured and updated by an evolved node B.

6. The traffic control system of claim 2, wherein a broadcast range of the transmitter within said proximity enabled traffic user equipment is adjustable.

7. The traffic control system of claim 6, wherein the broadcast range of the transmitter of said proximity enabled traffic user equipment is adjusted automatically depending on the proximity service application identifier of the broadcasted discovery message.

8. The traffic control system of claim 1, wherein the string of traffic labels comprises traffic direction information indicating a current or a future moving direction of a different proximity enabled traffic user equipment of a mobile entity.

9. The traffic control system of claim 1, wherein the string of traffic labels comprises at least one of: validity information indicating a validity time, a validity range and a validity scope of carried traffic information attributes.

10. A method for providing traffic control, the method comprising:
broadcasting a discovery message to a proximity enabled traffic user equipment to discover another proximity enabled traffic user equipment in a vicinity of the proximity enabled traffic user equipment;
selectively matching a received proximity service application code contained in a broadcasted discovery message with proximity service application codes stored in a configurable lookup application code memory to retrieve a matching proximity service application identifier comprising a string of traffic labels carrying traffic information attributes; and
processing the matching proximity service application identifier to generate control data for controlling an actuator.

11. The method of claim 10, wherein a broadcast range of the broadcasted discovery message is adjusted automatically depending on the matching proximity service application identifier.

12. The method of claim 10, wherein the string of traffic labels comprises at least one of: traffic direction information indicating a current and a future moving direction of a different proximity enabled traffic user equipment of a mobile entity.

13. The method of claim 10, wherein the string of traffic labels comprises at least one of: validity information indicating a validity time, a validity range and a validity scope of the carried traffic information attributes.

* * * * *